(12) United States Patent  
MacArthur

(10) Patent No.: US 9,199,860 B2  
(45) Date of Patent: Dec. 1, 2015

(54) APPARATUS AND METHOD FOR NONLINEAR PROCESS IDENTIFICATION USING ORTHONORMAL BASES AND ORDINAL SPLINES IN A PROCESS CONTROL SYSTEM

(75) Inventor: J. Ward MacArthur, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 869 days.

(21) Appl. No.: 13/324,215

(22) Filed: Dec. 13, 2011

(65) Prior Publication Data

US 2012/0323342 A1    Dec. 20, 2012

Related U.S. Application Data

(60) Provisional application No. 61/497,778, filed on Jun. 16, 2011.

(51) Int. Cl.
| | | |
|---|---|---|
| *G06F 19/00* | (2011.01) | |
| *C02F 1/00* | (2006.01) | |
| *G05B 13/04* | (2006.01) | |

(52) U.S. Cl.
CPC .............. *C02F 1/008* (2013.01); *G05B 13/048* (2013.01)

(58) Field of Classification Search
USPC ................. 700/276, 29, 45; 703/13
See application file for complete search history.

(56) References Cited

U.S. PATENT DOCUMENTS

| | | | | |
|---|---|---|---|---|
| 5,610,843 | A | * | 3/1997 | Chou ............................ 702/109 |
| 5,841,909 | A | * | 11/1998 | Yokoyama .................... 382/243 |
| 6,026,332 | A | * | 2/2000 | Kenknight et al. ........... 607/129 |
| 2006/0119783 | A1 | * | 6/2006 | Fukuoka et al. .............. 349/176 |

OTHER PUBLICATIONS

Idesntification and control of Nonliner System Using Fuzzy Hammerstein Models, Abonyi et al., 2000, University of Veszrem, pp. 4302-4314.*
Vodencareic et al, Identifying Behavior Models for Process Plants, 2011, IEEE p. 1-8.*
Toth et al. Identification of nolinear process models in an LPV framwork, Jul. 5-7, 2010, Delft University of Technology , p. 869-874.*
Toth, et al., An LPV identification Framwork Based on Orthonatmal Bais Functions, Jul. 6-8, 2009, Delft Universtiy of technology, p. 1328-1333.*

(Continued)

*Primary Examiner* — Kidest Bahta

(57) ABSTRACT

A method includes receiving data associated with operation of an industrial process system. The method also includes identifying a model defining a behavior of the industrial process system using the data, an orthonormal bases function, and an ordinal spline bases function. The orthonormal bases function can be generated using estimated poles of the industrial process system. The ordinal spline bases function can be generated using a specified set of cubic splines. The ordinal spline bases function can also be generated using a distribution of knots and multiple ordinal spline functions associated with the knots. More knots can be associated with a more nonlinear portion of the industrial process system, and fewer knots can be associated with a less nonlinear portion or a linear portion of the industrial process system.

24 Claims, 19 Drawing Sheets

(56) References Cited

OTHER PUBLICATIONS

Juan C. Gomez, Identification of Nonlinear system using Orthonormal Bases, 2001, Universty Nacional de Rosario, p. 118.*

Dempsey et al., Indetification of Hammerstein Models with Cubic Spline Nonlinearities, Feb. 2004, Ieee, p. 237-245.*

Heuberger et al., A Generalized Orthonormal Basis for linear Dynamical Systems, Mar. 3, 1995, IEEE, p. 451-465.*

Tufa, et al.; "Development of Box-Jenkins type time series models by combining conventional and orthonormal basis filter approaches"; Journal of Process Control; 2010; 13 pages.

Gomez, et al.; "Identification of block-oriented nonlinear systems using orthonormal bases"; Journal of Process Control; 2004; pp. 685-697.

Gomez, et al.; "Identification of Nonlinear Systems using Orthonormal Bases"; Laboratory for System Dynamics FCEIA, Universidad Nacional de Rosario; Mar. 2003; 14 pages.

Er-Wei Bai, "Identification of an Additive NFIR System and its applications in generalized Hammerstein models" 44th IEEE Conference on Decision and Control and the European Control Conference 2005; Dec. 12-15, 2005; pp. 6406-6411.

Chan, et al.; "Identification of MIMO Hammerstein systems using cardinal spline functions"; Journal of Process Control; 2006; 12 pages.

Renfro, et al.; "Simultaneous Optimization and Solution of Systems Described by Differential/Algebraic Equations";Comput.chem. Engng, vol. 11. No. 5; 1987; pp. 503-517.

Baumrucker, et al; "MPEC Problem Formulations in Chemical Engineering Applications"National Science Foundation; Jun. 16, 2007; 28 pages.

Balakrishnan et al; "Neurocontrol: A Literature Survey"; Mathl. Comput. Modeling vol. 23, No. 1/2; 1996; pp. 101-117.

Thomas H. Kerr; "Critique of Some Neural Network Architectures and Claims for Control and Estimation" IEEE Transactions on Aerospace and Electronic Systems; vol. 34, No. 2 Apr. 1998; pp. 406-419.

Zilkova, et al.; "Nonlinear System Control Using Neural Networks"; Acta Polytechnica Hungarica, vol. 3 No. 4; 2006; pp. 85-94.

Ruanne Delport; "Process Identification Using Second Order Volterra Models for Nonlinear Model Predictive Control Design of Flotation Circuits" University of Pretoria etd; Dec. 2, 2004; 161 pages.

Ling, et al.; "Control Relevant Model Reduction of Volterra Series Models"; Dept of Chemical, Bio, and Materials Engineering; Sep. 4, 1996; 22 pages.

Li, et al.; High-Order Volterra Model Predictive Control and Its Application to a Nonlinear Polymerisation Process; International Journal of Automation and Computing 2; 2005; pp. 208-214.

Eskinat, et al.; "Use of Hammerstein Models in Identification of Nonlinear Systems" AlChE Journal, vol. 37, No. 2; Feb. 1991; pp. 255-268.

Totterman, et al.; "Support vector mehod for identification of Wiener models"; Journal of Process Control; 2009; pp. 1174-1181.

Wang, et al.; "Least squares based and gradient based iterative identification for Wiener nonlinear systems"; Signal Processing; 2001; pp. 1182-1189.

Yucai Zhu; "Estimation of an N-L-N. Hammerstein-Wiener model"; Automatica 38; 2002; pp. 1607-1612.

Bo Wahlberg; "System Identification Using Laguerre Models; IEEE Transactions on Automatic Control" vol. 36, No. 5; May 1991; pp. 551-562.

William H. Kautz; "Network Synthesis for Specified Transient Response" Technical Report No. 209, Research Laboratory of Electronics, Apr. 23, 1952; 183 pages.

Bo Wahlberg; "System Identification Using Kautz Models" IEEE Transactions on Automatic Control, vol. 39, No. 6; Jun. 1994; pp. 1276-1282.

Juan Carlos Gomez; "Analysis of Dynamic System Identification using Rational Orthonormal Bases" Dept of Electrical and Computer Engineering, The University of Newcastle New South Wales, Australia, Feb. 1998; 209 pages.

Ninness, et al; "A Unifying Construction of Orthonormal Bases for System Identification"; Proceedings of the 33rd Conference on Decision and Control; Lake Buena Vista, FL; Dec. 1994; pp. 3388-3393.

Qin, et al; "A survey of industrial model predictive control technology"; Control Engineering Practice 11; 2003; pp. 733-764.

Patwardhan, et al.; "From data to diagnosis and control using generalized orthonormal basis filters. Part I: Model predictive and fault tolerant control" Dept of Chemical Engineering, Indian Institute of Technology, Bombay, Powai, Mumbai India; pp. 157-175, Aug. 6, 2004.

Patwardhan, et al.; "From data to diagnosis and control using generalized orthonormal basis filters. Part II: Development of state observers" Dept of Chemical Engineering, Indian Institute of Technology, Bombay, Powai, Mumbai India; pp. 819-835, Aug. 6, 2004.

Lind, et al; "Regressor and Structure Selection in NARX Models Using a Structured ANOVA Approach"; Division of Automatic Control, Dept of Electrical Engineering, Linkoping, Sweden; Jun. 12, 2007; 13 pages.

Jacobsen, et al.; "Multiple Steady States in Ideal Two-Product Distillation" Chemical Engineering Norwegian Institute of Technology (NTH); Norway; Nov. 1990; 33 pages.

\* cited by examiner

APPARATUS AND METHOD FOR NONLINEAR PROCESS IDENTIFICATION USING ORTHONORMAL BASES AND ORDINAL SPLINES IN A PROCESS CONTROL SYSTEM

CROSS-REFERENCE TO RELATED APPLICATION AND PRIORITY CLAIM

This application claims priority under 35 U.S.C. §119(e) to U.S. Provisional Patent Application No. 61/497,778 filed on Jun. 16, 2011, which is hereby incorporate by reference.

TECHNICAL FIELD

This disclosure relates generally to control systems. More specifically, this disclosure relates to an apparatus and method for nonlinear process identification using orthonormal bases and ordinal splines in a process control system.

BACKGROUND

Processing facilities are often managed using process control systems. Example processing facilities include manufacturing plants, chemical plants, crude oil refineries, ore processing plants, and paper or pulp manufacturing and processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected.

Model predictive control (MPC) is a widely-accepted control technique and is used throughout many industries. Currently, linear models are used by the vast majority of installed commercial MPC applications. There is, however, a growing recognition of the benefits of using nonlinear modeling and control. This realization has historically been tempered, largely due to increased demands on plant operations and the need (real or perceived) for highly-skilled personnel.

Although process industries at large are only beginning to pursue nonlinear techniques, the academic community has been engaged in a considerable amount of research in this area over the last few decades. For convenience, this research can be categorized into two broad approaches. One approach has focused on the use of "first principle" models, and the other approach has focused on the use of "empirical-based" models.

Early versions of nonlinear control based on first principle models were cast as a nonlinear programming (NLP) problem, where nonlinear programming was used to solve a set of differential algebraic equations (DAE). Typically, differential algebraic equations were derived by applying mass, energy, and momentum conservation equations to a system of interest. However, this was usually a very time-consuming process, required highly-skilled resources, and required continuous model updating. More recently, this approach has been extended to include discrete events. Problems of this class can be referred to as mixed-integer NLP (MINLP) and are receiving significant academic attention. While these and similar approaches have been successful in some areas (such as the polymer industry), they have not had wide acceptance due to their complexity.

SUMMARY

This disclosure provides an apparatus and method for nonlinear process identification using orthonormal bases and ordinal splines in a process control system.

In a first embodiment, a method includes receiving data associated with operation of an industrial process system. The method also includes identifying a model defining a behavior of the industrial process system using the data, an orthonormal bases function, and an ordinal spline bases function.

In a second embodiment, an apparatus includes at least one memory unit configured to store data associated with operation of an industrial process system. The apparatus also includes at least one processing unit configured to identify a model defining a behavior of the industrial process system using the data, an orthonormal bases function, and an ordinal spline bases function.

In a third embodiment, a computer readable medium embodies a computer program. The computer program includes computer readable program code for receiving data associated with operation of an industrial process system. The computer program also includes computer readable program code for identifying a model defining a behavior of the industrial process system using the data, an orthonormal bases function, and an ordinal spline bases function.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 30B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
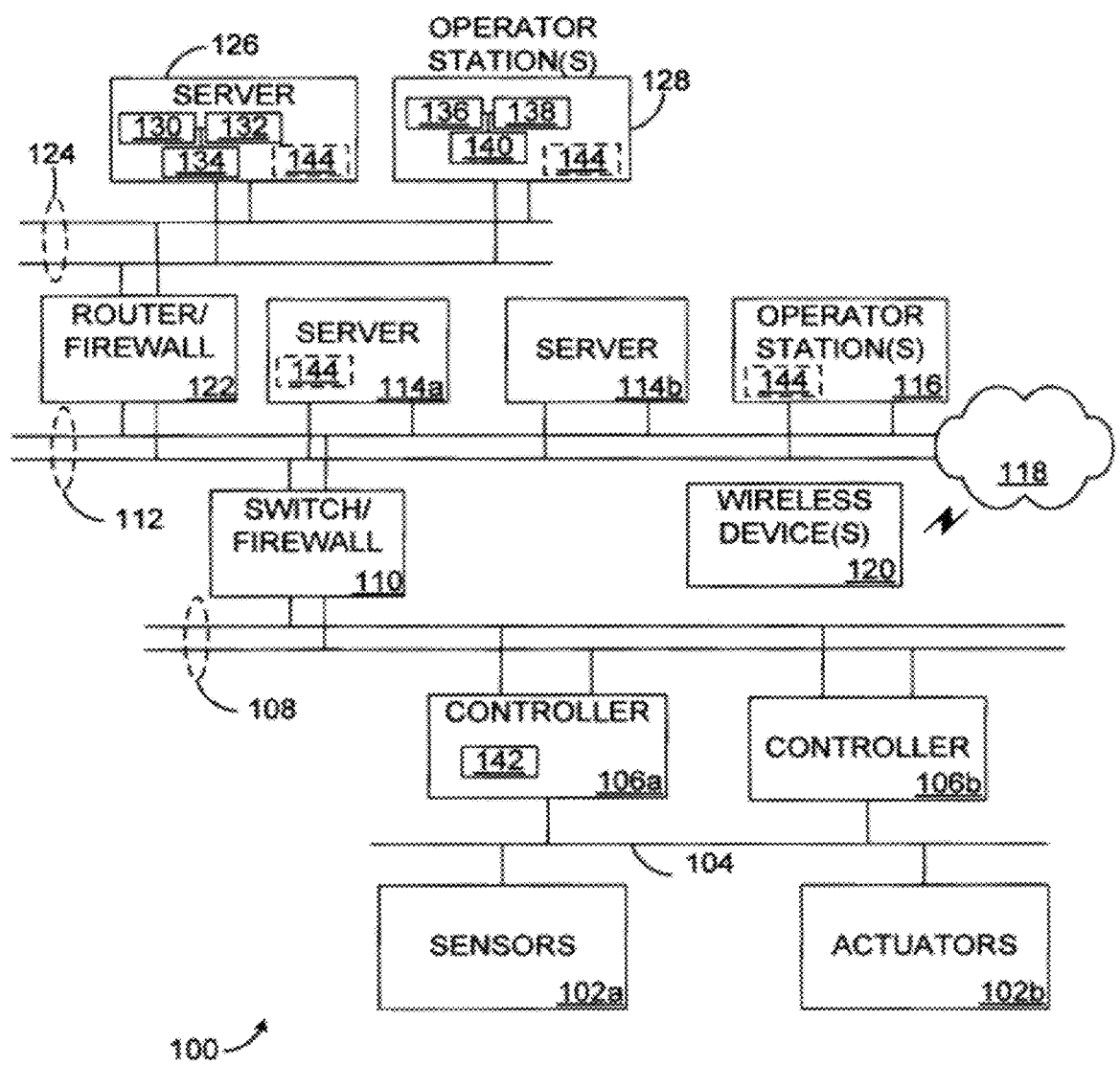
FIG. 1 illustrates an example process control system according to this disclosure.

FIG. 1 illustrates an example process control system 100 according to this disclosure. In this example embodiment, the system 100 includes various components that facilitate the monitoring and control of a process system. A process system represents any system or portion thereof configured to produce or process one or more materials in some manner. The process system typically includes multiple pieces of industrial equipment, which are monitored and controlled by the system 100.

As shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system and could represent heaters, motors, catalytic crackers, valves, or other actuator devices. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any suitable structure for interacting with the sensors 102a and controlling the actuators 102b. The controllers 106a-106b could, for example, represent multivariable controllers or other types of controllers.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure supporting communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any suitable structure for providing access to, control of, or operations related to the controllers 106a-106b.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any suitable structure for supporting user access and control of the system 100.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any suitable structure for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any suitable structure for supporting user access and control of the system 100.

In particular embodiments, the various servers and operator stations may represent computing devices. For example, each of the servers 114a-114b, 126 could include one or more processing units 130 and one or more memory units 132 for storing instructions and data used, generated, or collected by the processing unit(s) 130. Each of the servers 114a-114b, 126 could also include at least one network interface 134, such as one or more Ethernet interfaces. Also, each of the operator stations 116, 128 could include one or more processing units 136 and one or more memory units 138 for storing instructions and data used, generated, or collected by the processing unit(s) 136. Each of the operator stations 116, 128 could also include at least one network interface 140, such as one or more Ethernet interfaces.

In one aspect of operation, at least one of the controllers 106a-106b represents a multivariable model predictive control (MPC) controller or other type of controller that operates using a model 142. The model 142 generally represents at least part of an industrial process being controlled, such as by defining how the controller controls one or more of the actuators 102b based on input data from one or more of the sensors 102a. The identification of the model 142 (which involves a "system identification" defining how the process being controlled behaves) and the design of the controller 106*a*-106*b* (which involves selection of control parameters for the controllers) are often critical to the proper control of the process system.

In accordance with this disclosure, a tool 144 is provided in the system 100 at one or more locations. The tool 144 here implements a technique for nonlinear process identification. For example, the tool 144 analyzes various data and performs system identification to identify one or more models 142 for one or more controllers 106*a*-106*b*. The tool 144 enables the creation of nonlinear models based on empirical process data. This approach allows known information concerning process characteristics to be incorporated into a model. The tool 144 also supports full dynamic nonlinear behavior. The model(s) 142 created can be directly used for control by the controller(s) 106*a*-106*b*, which could represent HONEYWELL PROFIT controllers or other controllers.

For flexibility, the process identification performed by the tool 144 accommodates different model structures, such as Hammerstein, Wiener, and more general N-L-N block-oriented structures. Instruments having linear and nonlinear combinations of inputs and outputs are also accommodated. The tool 144 utilizes multiple bases functions, namely an orthonormal bases function and an ordinal spline bases function. The orthonormal bases function can be constructed using an estimate of the process poles, and the ordinal spline bases function can be constructed using a specified set of special cubic splines. Nonlinear dynamics are implicitly accommodated, and problems associated with identifying the linear portion of the model in conventional block-oriented formulations can be removed. Because of the bases function formulations, it is possible to solve the identification problem for many supported structures by convex optimization, which can help to avoid the inherent problems of iterative solutions. However, to help ensure open-loop unbiased estimates, any structures using output nonlinearities can use an iterative solution.

Additional details regarding a particular non-limiting embodiment of the tool 144 are provided below. Other embodiments of the tool 144 could also be used. The tool 144 could be implemented in any suitable manner. For instance, the tool 144 could be implemented using only hardware or using a combination of hardware and software/firmware instructions. In particular embodiments, the tool 144 could represent one or more computer programs executed by the processing unit(s) in the servers 114*a*-114*b*, 126 or the operator stations 116, 128.

Although FIG. 1 illustrates one example of a process control system 100, various changes may be made to FIG. 1. For example, a control system could include any number of sensors, actuators, controllers, servers, operator stations, networks, models, and tools. Also, the makeup and arrangement of the process control system 100 are for illustration only. Components could be added, omitted, combined, subdivided, or placed in any other suitable configuration according to particular needs. In addition, FIG. 1 illustrates one operational environment in which system identification can be used. This functionality could be used in any other suitable device or system.

FIGS. 2 through 30B illustrate details of an example tool 144 for nonlinear process identification using orthonormal bases and ordinal splines according to this disclosure. As described in more detail below, the tool 144 here supports empirical-based nonlinear model identification. There is an enormous body of work related to empirical-based nonlinear models, both with respect to identification and control. In the following discussion, it is assumed that block-oriented models are used, although other types of empirical-based nonlinear models (such as neural network and Volterra models) could also be used. In particular embodiments, the tool 144 could support the following practical and user-centric constraints:

- any parameters of the model 142 to be defined by the user can have a physical relationship to the operating process;
- models 142 can be open-loop unbiased;
- solutions can be robust and available in a time effective manner;
- all calculations can be done online and available while step testing is underway;
- all calculations can be self-contained (i.e. models 142 may not require extraneous calculations);
- signal injection may not be overly intrusive or cause major plant upsets;
- models 142 can be flexible and make sense to the user; and
- models 142 can be directly usable by nonlinear MPC (NLMPC) controllers and have minimal tuning extensions relative to conventional linear MPC.

A particular implementation of the tool 144 could support all or any subset of these features.

Figure 2:
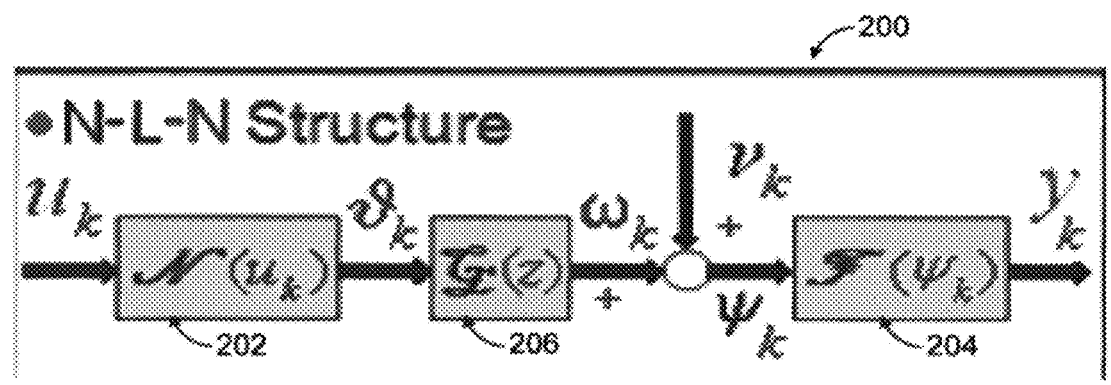
FIGS. 2 through 30B illustrate details of an example tool for nonlinear process identification using orthonormal bases and ordinal splines according to this disclosure.

Block-oriented models are a class of models that is relatively simplistic in form, and they are one of the most-frequently studied classes of all nonlinear structures. FIG. 2 illustrates a general form of a block-oriented model 200. In FIG. 2, an input block ($\mathcal{N}$) 202 and an output block ($\mathcal{F}$) 204 represent static (memory-less) nonlinearities. An intermediate block ($\mathcal{G}$) 206 is typically used to represent dynamics of the system being modeled, which are often taken to be linear time invariant (LTI). As described below, this problematic constraint is removed. For the time being, however, this structure 200 may be referred to as an "LTI block."

Also supported within the structure 200 are internal input and output instruments $\upsilon$ and $\psi$ respectively. Since multiple-input multiple-output (MIMO) models can be supported by the tool 144, any number of input instruments $\upsilon$ may appear as a nonlinear operator with any other input instruments $\upsilon$. A similar statement can be made for output instruments $\psi$.

Within this class of models, the following three well-known structures may be supported by the tool 144:

Hammerstein: This is one of the most frequently used structures and includes a cascade connection between a static nonlinear block followed by an LTI dynamic block. This structure can be denoted as "N-L."

Wiener: Here, the cascade connection of the Hammerstein model is reversed, and this structure is denoted as "L-N."

Hammerstein-Wiener System: In this structure, all block elements are used directly as shown in FIG. 2, and this structure is denoted as "N-L-N."

These structures have been widely used to represent a large number of applications. It is worth noting, however, that many of the block-oriented methods focus on single-input single-output (SISO) models or, if MIMO, there is little if any attention paid to the role of instruments as alluded to above. More attention to this detail is given below.

In addition to the structure shown in FIG. 2, the realization of the various blocks 202-206 can have a profound impact on the success or failure of any final implementation. Various techniques are known for realizing the static and dynamic blocks 202-206 given in FIG. 2. Nonlinear elements from polynomials to neural nets to radial bases functions have been proposed. Dynamic elements from prediction error methods to sub-space models to auto-regression with exogenous input (ARX) models have also been proposed. In one particular approach, a block-oriented approach based on orthonormal bases functions is used, where the formulation leads to a linear-in-the-parameters regression. In another particular approach, the nonlinearities of the Hammerstein block are represented by a set of cardinal spline functions. These functions are well-structured and enable the use of a priori process information to help define the nonlinearities.

In accordance with this disclosure, a combination of two bases functions that can be described prior to actual regression calculations is used. An orthonormal bases function is used to capture process dynamics, and an ordinal spline bases function is used to capture static nonlinearities.

Orthonormal Bases Functions

Early work on orthonormal bases functions (OBFs) for LTI identification was driven by the need for parsimonious models that are linear in the parameters. The idea of incorporating a priori information into the function led to the so-called Laguerre model. For resonant systems, the Kautz bases has been suggested and analyzed. A unifying construction of orthonormal bases functions for LTI identification is given in Ninness et al., "A Unifying Construction of Orthonormal Bases for System Identification," IEEE Transactions on Automatic Control, 42 (4) (1997), 515-521 (which is hereby incorporated by reference). The basic model structure, shown in SISO form for clarity, is given by:

$$y_k = \left( \sum_{i=0}^{\lambda-1} \theta_i \mathscr{B}_i(z) \right) u_k \quad (1)$$

where y is the output, u is the input, $\lambda$ is the number of poles, $\theta$ are unknown coefficients, and $\mathscr{B}$ are rational orthonormal bases functions defined by the following inner product on $H_2(T)$ with $$T \triangleq \{z : |z| = 1\}:$$

$$\langle \mathscr{B}_n, \mathscr{B}_m \rangle = \delta_{n,m} = \frac{1}{2\pi} \int_{-\pi}^{\pi} \mathscr{B}_n(e^{j\omega}) \overline{\mathscr{B}_m(e^{j\omega})} d\omega \quad (2)$$

$$\delta_{n,m} = \begin{cases} 1 & n = m \\ 0 & n \neq m \end{cases}$$

In Equation (2), $\delta$ is referred to as the Kronecker delta.

In re-deriving the functions for use here, several modifications have been made. One is the correction of the sign of the second term of the quadratic expression in the denominator of the equation for the bases functions representing complex poles. Another is a modification to equation (16) of Ninness et al. As posed in Ninness et al., this expression has an infinite number of solutions, all lying on a well-defined ellipse. The modification used here is the addition of an equality constraint such that $\beta - \mu = 0$ (in the original nomenclature). With these modifications, the bases functions (BF) can be specified for the general case, where there are n real poles $\xi_0, \xi_1, \ldots \xi_{n-1}$, p sets of complex poles $\{\xi_n, \bar{\xi}_n\} \ldots \{\xi_{n+2(p-1)}, \bar{\xi}_{n+2(p-1)}\}$, and q intervals of pure delay. For the n real poles, the bases functions can be written as:

$$\mathscr{B}_j(z) = z^{-(q+1)} \frac{a^j}{1 - \xi_j z^{-1}} \prod_{k=0}^{j-1} \frac{z^{-1} - \xi_k}{1 - \xi_k z^{-1}} j = 0 \to n-1 \quad (3)$$

For the p complex poles (where $i=0 \to p-1$), the m and m+1 bases functions can be written as:

$$\mathscr{B}_m(z) = \frac{z^{-(q+1)} a^m \Omega^i (1 + z^{-1})}{1 - (\xi_m + \bar{\xi}_m) z^{-1} + |\xi_m|^2 z^{-2}} \prod_{k=0}^{m-1} \frac{z^{-1} - \bar{\xi}_k}{1 - \xi_k z^{-1}} \quad (4)$$

$$\mathscr{B}_{m+1}(z) = \frac{z^{-(q+1)} a^m \Phi^i (1 - z^{-1})}{1 - (\xi_m + \bar{\xi}_m) z^{-1} + |\xi_m|^2 z^{-2}} \prod_{k=0}^{m-1} \frac{z^{-1} - \bar{\xi}_k}{1 - \xi_k z^{-1}} \quad (5)$$

In these expressions, $m = n + 2i$, and the coefficients can be given by:

$$\Omega^i = \sqrt{\frac{|1 - \xi_m^2|^2}{2(1 + |\xi_m|^2) + 4\operatorname{Re}(\xi_m)}} \quad (6)$$

$$\Phi^i = -\frac{(\Psi^i + 1)\Omega^i}{\sqrt{1 - \Psi^{i2}}}$$

$$\Psi^i = \frac{2\operatorname{Re}(\xi_m)}{1 + |\xi_m|^2}$$

$$a^k = \sqrt{1 - |\xi_k|^2}$$

In these equations, the over-bar character indicates a complex conjugate. Upon closer inspection of Eqs. (3)-(5), it can be seen that the bases functions can be thought of as a sequence of discrete time filters. This perspective is expanded upon below.

To specify the poles given in the previous expressions, various methods can be used. For example, if there is a priori information available, the poles can be specified manually. In a typical application, this is not the case, so an automated method can be used. For instance, the automated method could use the global multi-stage (GMS) algorithm described in detail in MacArthur et al., "A Practical Global Multi-Stage Method for Fully Automated Closed-Loop Identification of Industrial Process," Journal of Process Control, 17 (10) (2007), 770-786 (which is hereby incorporated by reference). This algorithm is well-tested and may be ideal for this application. The GMS algorithm returns a continuous-time reduced-order transfer function matrix, where each sub-model is ranked with respect to model quality. Poles and delays are recovered from each sub-model whose quality is higher than a specified threshold. Recovered poles are sorted with redundant elements removed. Finally, a heuristic is used to distribute the poles as evenly as possible from greatest to least such that the final number of poles is less than a user-specified maximum. The remaining poles are then used to construct the bases functions.

Ordinal Spline Bases Functions

The use of splines to represent static nonlinearities has become ubiquitous. Here, the splines are not used to represent the nonlinearities directly but rather to form flexible bases. Hence, they are referred to as ordinal splines. These functions can be derived from the well-known cubic spline, which can be represented as shown in Eq. (7) for m splines and m+1 discrete points referred to as "knots." Also shown in this expression are the first and second derivatives.

$$\vartheta(u) = S(u) = \begin{cases} S_1(u) & u_1 \leq u < u_2 \\ S_2(u) & u_2 \leq u < u_3 \\ \vdots & \vdots \\ S_m(u) & u_m \leq u < u_{m+1} \end{cases} \quad (7)$$

$$S_j(u) = a_j(u - u_j)^3 + b_j(u - u_j)^2 + c_j(u - u_j) + d_j$$

$$S'_j(u) = 3a_j(u - u_j)^2 + 2b_j(u - u_j) + c_j$$

$$S''_j(u) = 6a_j(u - u_j) + 2b_j$$

Typically, inputs u and outputs υ at the knot points are taken from plant data. Hence, the splines become part of the identification.

To create the bases functions, the splines are normalized. Let there be m+1 ordinal spline functions (OSFs) corresponding to the m+1 knots. Further, let each of the functions be defined by a normalized version of the cubic splines with m segments and m+1 knots as shown in Eq. (7). Construct the OSF such that $S''_1(u_1) = S''_{m+1}(u_{m+1}) \equiv 0$ and the splines along with their first and second derivatives are continuous at each knot. Then, the $k^{th}$ OSF for the $j^{th}$ cubic spline segment can be given by:

$$S''_{j-1}(u_j - u_{j-1}) + 2S''_j(u_{j+1} - u_{j-1}) + S''_{j+1}(u_{j+1} - u_j) = \quad (8)$$

$$6\left[ \frac{(\delta_{k,j+1} - \delta_{k,j})}{(u_{j+1} - u_j)} - \frac{(\delta_{k,j} - \delta_{k,j-1})}{(u_j - u_{j-1})} \right]$$

where δ is the Kronecker delta described above. The indices in Eq. (8) are j=2→m and k=1→m+1.

The first and last terms on the left-hand side of Eq. (8) can be dropped since the first and last knots are due to boundary conditions given above. Hence, the left-hand side of Eq. (8) results in a tri-diagonal matrix (TDM) $\in \Re^{(m-1),(m-1)}$, and this system of equations can be solved for the second derivatives of the splines at each knot. Once the second derivatives are known, the coefficients for the splines in Eq. (8) can be recovered from:

$$a_j = \frac{S''_{j+1} - S''_j}{6(u_{j+1} - u_j)}; \; b_j = \frac{S''_j}{2}; \; d_j = \delta_{k,j} \quad (9)$$

$$c_j = \frac{\delta_{k,j+1} - \delta_{k,j}}{(u_{j+1} - u_j)} - \frac{(S''_{j+1} + 2S''_j)(u_{j+1} - u_j)}{6}$$

Notice that only a description of the knots is needed for the solution of Eqs. (8) and (9). The knots can be interpreted as points on a grid and can be defined prior to any identification. This formulation directly supports incorporation of a priori information in that more knots can be placed in highly non-linear regions and less knots elsewhere. As a simple example, consider a grid with five equally spaced knots. For this case, Eq. (8) can be solved as shown in Eq. (9). The $k^{th}$ column in S" corresponds to the second derivatives at knots two, three, and four for the $k^{th}$ OSF. The B matrix corresponds to the right-hand side of Eq. (8) for the five splines:

$$A = \begin{bmatrix} 4 & 1 & 0 \\ 1 & 4 & 1 \\ 0 & 1 & 4 \end{bmatrix}; B = 6\begin{bmatrix} 1 & -2 & 1 & 0 & 0 \\ 0 & 1 & -2 & 1 & 0 \\ 0 & 0 & 1 & -2 & 1 \end{bmatrix} \quad (10)$$

$$S'' = R^{-1}Q^T B$$

where: $A = QR$

Figure 3:
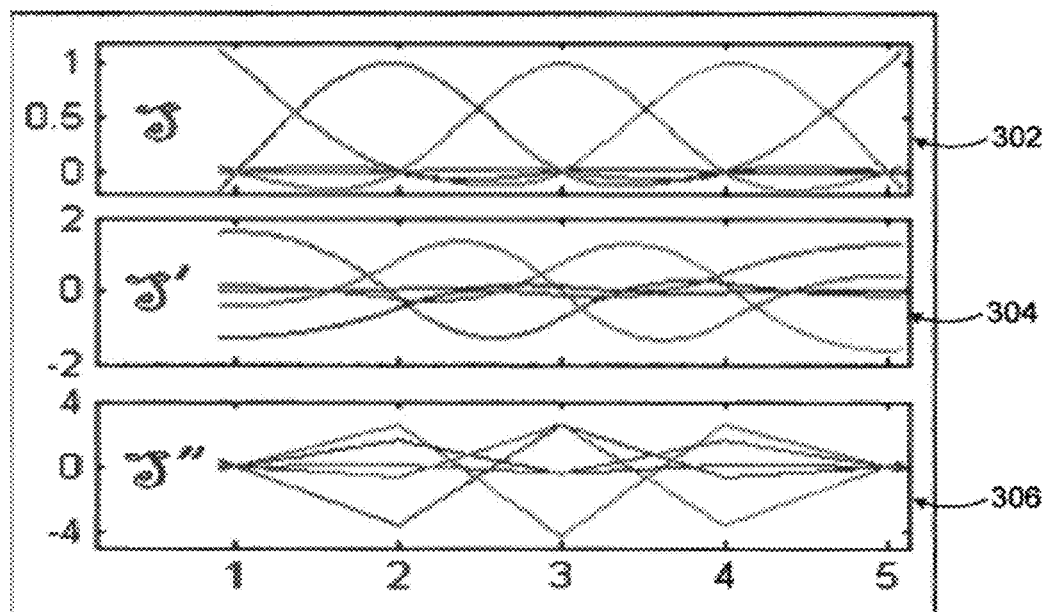

Due to the boundary constraints, the second derivatives at knots one and five are zero. Let the $k^{th}$ OSF be designated as $\tilde{\mathfrak{S}}^k$ and have the spline structure given in Eq. (7). The solution of Eq. (10) yields the five OSFs 302 along with their first and second derivatives 304-306 as shown in FIG. 3. Of particular note is the fact that the functions and their first derivatives are smooth and well-behaved, especially at the boundaries. Properties of the OSF include:

$$\tilde{\mathfrak{S}}^k(u_j) = \delta_{k,j}; \sum_{k=1}^{m+1} \tilde{\mathfrak{S}}^k(u) = 1 \quad (11)$$

Hence, the OSFs at the knots are either zero or one, and the sum of all splines for any value between the knots is identically equal to one.

It is therefore possible to construct a new nonlinear static function in terms of these bases. Consider the SISO case where there are p knots and n measurements. The nonlinear relationship can be expressed in terms of linear coefficients as:

$$\vartheta = \tilde{\mathfrak{S}}(u)c \quad (12)$$

$$\tilde{\mathfrak{S}}(u) = \begin{bmatrix} \tilde{\mathfrak{S}}^1(u_1) & \tilde{\mathfrak{S}}^2(u_1) & \cdots & \tilde{\mathfrak{S}}^p(u_1) \\ \tilde{\mathfrak{S}}^1(u_2) & \tilde{\mathfrak{S}}^2(u_2) & \cdots & \tilde{\mathfrak{S}}^p(u_2) \\ \vdots & \vdots & \ddots & \vdots \\ \tilde{\mathfrak{S}}^1(u_n) & \tilde{\mathfrak{S}}^2(u_n) & \cdots & \tilde{\mathfrak{S}}^p(u_n) \end{bmatrix} c = \begin{bmatrix} \alpha_1 \\ \alpha_2 \\ \vdots \\ \alpha_p \end{bmatrix}$$

Given an n×1 input vector u, the $\tilde{\mathfrak{S}}$ matrix is immediately known from the knot selection. With an instrument vector υ specified, the calculation of the coefficients is a simple least-squares problem. Conversely, with the coefficients and inputs known, the prediction of υ is a simple multiplication.

Instruments

For the MIMO problem, there are nu inputs and ny outputs. With nonlinear identification, it is possible to have nonlinear combinations of two or more input variables that have a significant effect on the process output. Similarly, it is possible to have nonlinear combinations of two or more internal or intermediate variables that have a significant effect on the output. These variables are referred to as "instruments." Unfortunately, if all possible combinations of instruments are accounted for, there are $2^{nu}-1$ and $2^{ny}-1$ possible combinations of input and output instruments. Techniques exist for automatically determining these structures for certain cases, such as in Ljung et al., "Regressor and Structure Selection in NARX Models Using a Structured ANOVA Approach," Automatica, 41 (3) (2009), 383-395 (which is hereby incorporated by reference). These techniques have not yet found widespread commercial use but could be used in this offering. Two types of instruments are discussed below:

first-order instruments that consider all linear combinations of inputs/outputs; and high-order instruments that use only the highest-order of nonlinear input/output interaction.

Let $\mathfrak{S}_j^k(u_j)$ and $p_j$ be the $k^{th}$ ordinal spline and number of knots for the $j^{th}$ input, respectively. Further, let $q=\max(p)$. The first-order and high-order instruments can be constructed as shown below for input instruments (output instruments can have the same structure).

With first-order instruments, all linear combinations of ordinal splines are supported, and a modified form of Eq. (12) can be used to give the $i^{th}$ instrument as:

$$\vartheta_i = \sum_{j=1}^{nu}\left(\sum_{k=1}^{q} a_{i,j}^k \mathfrak{S}_j^k(u_j)\right); i = 1 \to nu \quad (13)$$

It may be convenient to rewrite this expression in general as:

$$A_k = \begin{bmatrix} a_{1,1} & a_{1,2} & \cdots & a_{1,nu} \\ a_{2,1} & a_{2,2} & & \vdots \\ \vdots & & \ddots & \\ a_{nu,1} & \cdots & & a_{nu,nu} \end{bmatrix}_k \quad (14)$$

$$S_k = \begin{bmatrix} \mathfrak{S}_1^k(u_1) \\ \mathfrak{S}_2^k(u_2) \\ \vdots \\ \mathfrak{S}_{nu}^k(u_{nu}) \end{bmatrix}$$

$$\vartheta = \sum_{k=1}^{q} A_k S_k$$

$$\mathfrak{S}_j^k \equiv 0; \ p_j < q$$

Non-interacting instruments are obtained by setting off-diagonal terms in A to zero.

With high-order instruments, multiplicative combinations of ordinal splines are supported. As such, the $i^{th}$ instrument can have a fundamentally different structure than shown previously. Ordinal splines appear in a power series as given in Eq. (15):

$$\vartheta_i = \sum_{k_1}^{p_1} \sum_{k_2}^{p_2} \cdots \sum_{k_{nu}}^{p_{nu}} \alpha_{k_1,k_2,\ldots k_{nu}}^j \prod_{m=1}^{nu} \mathfrak{S}_m^{k_m}(u_m) \quad (15)$$

As the iterative nomenclature used in Eq. (15) is non-standard, a simple example can illustrate the structure. Consider the case where there are three inputs with three knots, two knots, and one knot, respectively. The elements of the high-order instruments $\upsilon_i$ can be constructed as shown in Table 1.

TABLE 1

| $k_1=1$ | $k_2=1$ | $k_3=1$ | $\alpha^i_{1,1,1}$ | $\mathfrak{S}_1^1 \mathfrak{S}_2^1 \mathfrak{S}_3^1$ |
|---|---|---|---|---|
| $k_1=1$ | $k_2=2$ | $k_3=1$ | $\alpha^i_{1,2,1}$ | $\mathfrak{S}_1^1 \mathfrak{S}_2^2 \mathfrak{S}_3^1$ |
| $k_1=2$ | $k_2=1$ | $k_3=1$ | $\alpha^i_{2,1,1}$ | $\mathfrak{S}_1^2 \mathfrak{S}_2^1 \mathfrak{S}_3^1$ |
| $k_1=2$ | $k_2=2$ | $k_3=1$ | $\alpha^i_{2,2,1}$ | $\mathfrak{S}_1^2 \mathfrak{S}_2^2 \mathfrak{S}_3^1$ |
| $k_1=3$ | $k_2=1$ | $k_3=1$ | $\alpha^i_{3,1,1}$ | $\mathfrak{S}_1^3 \mathfrak{S}_2^1 \mathfrak{S}_3^1$ |
| $k_1=3$ | $k_2=2$ | $k_3=1$ | $\alpha^i_{3,2,1}$ | $\mathfrak{S}_1^3 \mathfrak{S}_2^2 \mathfrak{S}_3^1$ |

From this construction, it is readily apparent that these instruments can be written as:

$$\upsilon_i = h_i \tilde{S}$$

$$h_i = [\alpha_{1,1,1} \alpha_{1,2,1} \alpha_{2,1,1} \alpha_{2,2,1} \alpha_{3,1,1} \alpha_{3,2,1}]^i$$

$$\tilde{S} = [\mathfrak{S}_1^1 \mathfrak{S}_2^1 \mathfrak{S}_3^1 \mathfrak{S}_1^1 \mathfrak{S}_2^2 \mathfrak{S}_3^1 \ldots \mathfrak{S}_1^3 \mathfrak{S}_2^2 \mathfrak{S}_3^1]^T \quad (16)$$

or in general as:

$$\vartheta = H\tilde{S} \ H \in \mathfrak{R}^{nu,\beta} \ \tilde{S} \in \mathfrak{R}^{\beta,1} \ \beta = \prod_{m=1}^{nu} p_m \quad (17)$$

With the instruments defined by Eqs. (14), (15), and (17) and the orthonormal bases function defined by Eqs. (1)-(6), the various block-oriented models can be described as follows.

Block-Oriented Models

Starting with FIG. 2, the output of the dynamic block (intermediate block 206) in terms of the input instruments can be given by the MIMO form of Eq. (1) as:

$$\omega = \sum_{i=0}^{\lambda-1} B_i(\mathscr{A}_i \vartheta) \ B_i \in \mathfrak{R}^{ny,nu} \quad (18)$$

This expression can be filtered by the output nonlinear block 204 to give:

$$y = \mathscr{F}(\psi) = \mathscr{F}(\omega + v) \quad (19)$$

In Eq. (19), the functional is composed of ordinal splines constructed using Eqs. (8)-(11). Here, however, the outputs are used to define the knots. As was the case previously, both first-order and high-order instruments are accommodated.

Neglecting the output nonlinearity for the time being, inspection of FIG. 2 shows that $\hat\omega = \hat{y}$, and Eq. (18) represents the well-known Hammerstein structure. Model forms for this structure using both first-order and high-order instruments are given below.

N-L Model with First-Order Instruments

Substituting Eq. (14) into Eq. (18), taking the transpose, and expanding and rearranging terms gives the following expression for ny outputs given nu inputs. Note that the bases functions appear as combined terms. Similarly, the matrices representing the unknown coefficients appear as combined terms. These sub-matrices are dimensioned nu×ny.

$$[\omega_1 \ \omega_2 \ \ldots \ \omega_{ny}] = \mathscr{A}_0 S_1^T A_1^T B_0^T + \mathscr{A}_0 S_2^T A_2^T B_0^T + \quad (20)$$
$$\ldots \mathscr{A}_0 S_q^T A_q^T B_0^T + \mathscr{A}_1 S_1^T A_1^T B_1^T + \mathscr{A}_1 S_2^T A_2^T B_1^T + \ldots \mathscr{A}_1 S_q^T A_q^T B_1^T +$$
$$\mathscr{A}_{\lambda-1} S_1^T A_1^T B_{\lambda-1}^T + \mathscr{A}_{\lambda-1} S_2^T A_2^T B_{\lambda-1}^T + \ldots \mathscr{A}_{\lambda-1} S_q^T A_q^T B_{\lambda-1}^T$$

This expression can be written in standard linear regression form as:

$$\omega = \varphi\theta; \ \omega = [\omega_1 \ \omega_2 \ \ldots \ \omega_{ny}] \quad (21)$$

$$\varphi = \begin{bmatrix} \mathscr{A}_0 S_1^T & \mathscr{A}_0 S_2^T & \ldots & \mathscr{A}_0 S_q^T \\ \mathscr{A}_1 S_1^T & \mathscr{A}_1 S_2^T & \ldots & \mathscr{A}_1 S_q^T \\ \vdots & & & \\ \mathscr{A}_{\lambda-1} S_1^T & \mathscr{A}_{\lambda-1} S_2^T & \ldots & \mathscr{A}_{\lambda-1} S_q^T \end{bmatrix}$$

-continued $$S_k^T = \begin{bmatrix} \mathscr{S}_1^k(u_1) & \mathscr{S}_2^k(u_2) & \cdots & \mathscr{S}_{nu}^k(u_{nu}) \end{bmatrix}$$

$$\theta = \begin{bmatrix} A_1^T B_0^T \\ \vdots \\ A_q^T B_{\lambda-1}^T \end{bmatrix} \quad \varphi \in \mathfrak{R}^{1,\lambda \cdot q \cdot nu}; \quad \theta \in \mathfrak{R}^{\lambda \cdot q \cdot nu, ny}$$

With N measurements of the input and output vectors, the solution for the coefficients θ of the N-L model can be obtained by solving the following two-norm problem:

$$\min_\theta \frac{1}{2} \|\Phi\theta - \Omega\|_2^2; \Phi \in \mathfrak{R}^{N, \lambda \cdot q \cdot nu}; \quad (22)$$

$$\Omega \in \mathfrak{R}^{N, ny} \therefore \theta = A^+ \Omega$$

Here, ω and hence Ω are composed solely of the output measurements y. Also, $A^+$ is the pseudo-inverse of Φ calculated from the following orthonormal decomposition:

$$\Phi = URV^T; R = \begin{bmatrix} R_{1,1} & 0 \\ 0 & 0 \end{bmatrix}; R_{1,1} \in \mathfrak{R}^{k,k} \quad (23)$$

$$A^+ = \begin{bmatrix} V_{1,1} R_{1,1}^{-1} U_{1,1} & V_{1,1} R_{1,1}^{-1} U_{2,1} \\ V_{2,1} R_{1,1}^{-1} U_{1,1} & V_{1,1} R_{1,1}^{-1} U_{2,1} \end{bmatrix}$$

In this expression, an upper triangular matrix R is rank k, where k is the pseudo-rank of Φ. The pseudo-rank can be determined internally and may be less than or equal to the true rank given by the singular value decomposition (SVD) of Φ since it accounts for the fact that Φ contains noisy single precision data. Given that the true process is contained in the model set spanned by Eq. (21) and the inputs are persistently exciting (k=λ×q×nu) and independent of the disturbance γ, under open-loop conditions the estimates given by Eq. (22) are consistent and unbiased. With conventional asymptotic assumptions satisfied, no lengthy discussion is necessary here since it is obvious from Eq. (22) that no output y occurs in the regressor matrix Φ. Hence, the estimates converge to their true values as N→∞.

Note that only bases functions appear in the regressor matrix. The starting point in forming the regressor matrix can be the creation of a spline matrix $\mathscr{S}$. Since each ordinal spline is simply an operator, the first nu columns in this matrix can be generated by passing the input data matrix (N, nu) through the first ordinal spline. Subsequent columns can be generated by passing the data matrix through all q ordinal splines such that the number of columns in $\mathscr{S}$ is nu×q.

Final construction of the regressor matrix can proceed in a similar fashion. Since each orthonormal bases function is a rational transfer function, they can be used as a bank of filters applied to the spline matrix directly to generate the final regressor matrix in a very efficient fashion. The first nu×q columns in Φ can be generated by filtering the spline matrix by the first orthonormal bases function. The process can continue by using all λ bases functions until there are λ×nu×q columns. By construction, the spline matrix $\mathscr{S}$ can be rank-deficient due to the summation expression in Eq. (11). This problem can be corrected by removing the nu redundant columns from $\mathscr{S}$. For all inputs where $p_i<q$, the spline function is identically zero. Hence, corresponding columns in Φ and rows in θ can be removed before solving Eq. (22). Note that the nonlinear model may require no iteration for the estimation of the unknown coefficients as they are the result of a least-squares (LS) solution.

N-L Model with High-Order Instruments

Creation of these models can follow in an identical fashion to that given previously. Substituting Eq. (16) into Eq. (17), taking the transpose, and expanding and rearranging terms gives the following expression for high-order instruments:

$$y = \varphi\theta; \quad y = \begin{bmatrix} y_1 & y_2 & \cdots & y_{ny} \end{bmatrix} \quad (24)$$

$$\varphi = \begin{bmatrix} \mathscr{A}_0' \bar{S}^T & \mathscr{A}_1' \bar{S}^T & \cdots & \mathscr{A}_{\lambda-1}' \bar{S}^T \end{bmatrix}$$

$$\bar{S}^T = \begin{bmatrix} \mathscr{S}_1^1 \mathscr{S}_2^1 \mathscr{S}_3^1 & \cdots & \mathscr{S}_{nu}^1 & \mathscr{S}_1^1 \mathscr{S}_2^2 \mathscr{S}_3^1 & \cdots & \mathscr{S}_{nu}^1 & \cdots \end{bmatrix}$$

$$\theta = \begin{bmatrix} H^T B_0^T \\ \vdots \\ H^T B_{\lambda-1}^T \end{bmatrix} \quad \varphi \in \mathfrak{R}^{1,\beta}; \quad \theta \in \mathfrak{R}^{\beta,ny}$$

where β is defined in Eq. (16). Note that Eq. (24) has exactly the same form as Eq. (21), so its solution is given by Eq. (22) with the appropriate change in dimensions.

As was the case previously, this model form may require no iteration. Conventionally, the original A or H and B coefficient matrices are extracted once the θ matrix is available. In point of fact, this is neither desirable nor required in this formulation. Significant information can be lost even using the singular value method. Here, it is the convolution of the bases functions and the associated coefficients that facilitate the accommodation of nonlinear dynamics.

N-L-N Model

As shown in Eq. (19), the splines are based on ψ, which can be an unmeasurable unknown value. To proceed, the output nonlinearity can be required to be invertible. Hence, the method may be unable to accommodate I/O multiplicity, etc. With this assumption, the output expression of interest becomes:

$$\psi = \mathscr{F}^{-1}(y) \quad (25)$$

Let $\mathscr{C}_j^k(y_j)$ be the $k^{th}$ ordinal spline for the $j^{th}$ output and have the spline structure given in Eq. (7). For first-order instruments, Eq. (25) may be written as:

$$C_k = \begin{bmatrix} c_{1,1} & c_{1,2} & \cdots & c_{1,ny} \\ c_{2,1} & c_{2,2} & & \\ \vdots & & \ddots & \\ c_{ny,1} & \cdots & & c_{ny,ny} \end{bmatrix}_k \quad \mathscr{C}_k(y) = \begin{bmatrix} \mathscr{C}_1^k(y_1) \\ \mathscr{C}_2^k(y_2) \\ \vdots \\ \mathscr{C}_{n_y}^k(y_{ny}) \end{bmatrix} \quad (26)$$

$$\psi = \mathscr{F}^{-1}(y) = \sum_{k=1}^q C_k \mathscr{C}_k(y) \quad \mathscr{C}_j^k \equiv 0; \quad p_j < q$$

Note that this structure is identical to the form given in Eq. (14). High-order output instruments are identical to those shown previously and are not to be repeated here.

In general, it is possible to form L-N (Wiener) models in standard LS form and avoid iterations. Unfortunately, when used here, the resultant problem can be so ill-conditioned as to render the results useless. In addition, this formulation leads to biased estimates.

From FIG. 2, it is clear that the solution may require the minimization of the error ε=ω−ψ. Hence, the objective of any problem with an output nonlinearity is to estimate ω. To do this, the following iterative approach can be used (the discussion is given in the context of the N-L-N model but applies to the L-N structure if the input spline is taken as a unity operator). To begin, Eq. (22) is solved to get an initial estimate of $\theta$ by setting $\Omega=Y$. $\omega$ is then recovered as $\hat{\omega}=\Phi\theta$. Next, set $\psi=\hat{\omega}$ and use Eq. (26) to formulate the following regression problem:

$$\hat{\omega}=\phi\theta; \hat{\omega}=[\hat{\omega}_1 \hat{\omega}_2 \ldots \hat{\omega}_{ny}]$$

$$\phi=[\mathscr{E}_1^T(y) \; \mathscr{E}_2^T(y) \ldots \mathscr{E}_q^T(y)]$$

$$\mathscr{E}_k^T(y)=[\mathscr{E}_1^k(y_1) \; \mathscr{E}_2^k(y_2) \ldots \mathscr{E}_n^k(y_{ny})]$$

$$\theta=[C_1 \ldots C_q]^T; \phi\in\mathfrak{R}^{1,q\cdot ny}; \theta\in\mathfrak{R}^{q\cdot ny,ny} \quad (27)$$

Eq. (27) can be solved as a LS problem similar to Eq. (22). With $C_k$ known, Eq. (26) can be used as a predictor to calculate a new value for $\hat{\psi}$. Next, set $\omega=\hat{\psi}$ and resolve Eq. (22) for $\theta$. The procedure continues until the change in the error ($\omega-\psi$) is reduced to less than or equal to a small specified threshold. At convergence, $\theta$ can be used one last time to generate $\hat{\omega}=\Phi\theta$. This value of $\omega$ is then used with the ordinal spline function in Eq. (19) to formulate the following regression for the unknown D matrices:

$$y = \mathscr{F}(\hat{\omega}) = \sum_{k=1}^{q} D_k \mathscr{D}_k(\hat{\omega}); \quad (28)$$

$$y = \varphi\theta; \; y = [y_1 \; y_2 \; \ldots \; y_{ny}]$$

$$\varphi = [\mathscr{D}_1^T(\hat{\omega}_1) \; \mathscr{D}_2^T(\hat{\omega}_2) \; \ldots \; \mathscr{D}_q^T(\hat{\omega}_q)]$$

$$\mathscr{D}_q^T(\hat{\omega}) = [\mathscr{D}_1^k(\hat{\omega}_1) \; \mathscr{D}_2^k(\hat{\omega}_2) \; \ldots \; \mathscr{D}_{ny}^k(\hat{\omega}_{ny})]$$

$$\theta = [D_1 \; \ldots \; D_q]^T; \; \varphi \in \mathfrak{R}^{1,q\cdot ny}; \; \theta \in \mathfrak{R}^{q\cdot ny,ny}$$

Eq. (28) can be solved as a LS problem similar to Eq. (22) for $D_k$. With $\hat{\omega}$ and $D_k$ known, Eq. (28) can be used to predict the output as:

$$\hat{y} = \mathscr{F}(\hat{\omega}) = \sum_{k=1}^{q} D_k \mathscr{D}_k(\hat{\omega}) \quad (29)$$

Note that construction of the OSF in Eq. (28) utilizes a knot structure identical to that specified at design time for the OSF in Eq. (26). If the iterative procedure is simply considered as a method to determine $\omega$, at the last iteration the solution of Eq. (27) is not required, and the final problem can be solved using only Eq. (22) with $\omega$ substituted for Y and Eq. (29). As y appears in neither regressor matrix, the estimates of $\theta$ and $D_k$ are unbiased.

Identification Technique

Figure 4:
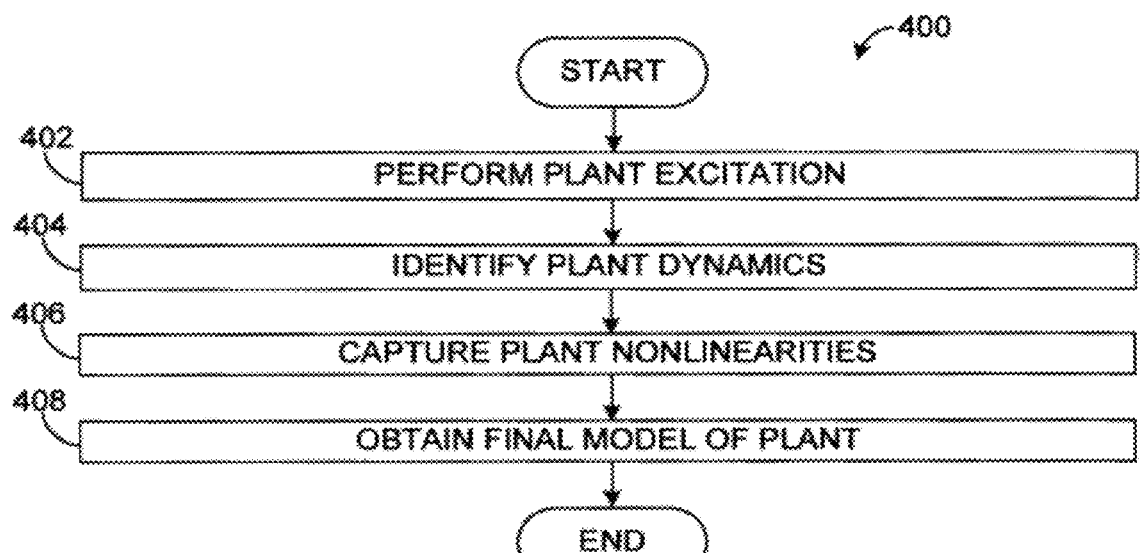

FIG. 4 illustrates an example method 400 for nonlinear process identification according to this disclosure. Ideally, identification is done as an integrated part of the plant step testing procedure (although this is not required). This type of approach has become widely accepted and successful for linear MPC as witnessed to by the commercial availability of automated on-line identification products. One objective of this patent document is to continue in this direction for nonlinear identification and control. One way to accomplish this is to allow for incremental model development, which is the approach taken here.

Plant excitation occurs at step 402. This could include, for example, providing various inputs to an industrial process and examining how various outputs of the process change. Details of signal design for persistent excitation of the models discussed here are beyond the scope of this document. However, a few comments are in order as the various structures impose unique requirements on plant tests. For first-order non-interacting instruments, Hammerstein and Wiener models may show identical steady-state behavior. However, the differences in their dynamic responses can be profound. For Hammerstein models of this class, the shape of the step response curve may be independent of the input amplitude. This is not the case for models with output nonlinearities (such as Wiener models) since the dynamic response is a function of the step magnitude itself. This can be significant. In the former case, a pseudo-random binary sequence (PRBS) of reasonable amplitude can be applied at appropriate levels. In the latter case, a pseudo-random multilevel sequence (PRMS) may be used. Operating plants are used to PRBS signals, so extensions to performing them at multiple levels may be natural. Convincing plant personnel to use PRMS signals may be an uphill battle. Use of high-order instruments may require some sort of PRMS as the nonlinear interactions can be amplitude-dependent.

Plant dynamics are identified at step 404. For example, based on prior plant knowledge, a tentative structure can be selected, and it can then be decided if linear or nonlinear dynamics are required. If only linear dynamics are required, a conventional open/closed loop step test can be performed at a nominal operating point. Otherwise, conventional tests can be performed at multiple operating points that span the desired operating range. Typically, a small number (such as only 3-5) of operating points may be needed if chosen properly. Note that conventional step tests may be all that is needed to determine the system Eigenvalues and hence create an orthonormal bases function. This step can be independent of the nonlinear identification and, once completed, does not need to be repeated.

Figure 5:
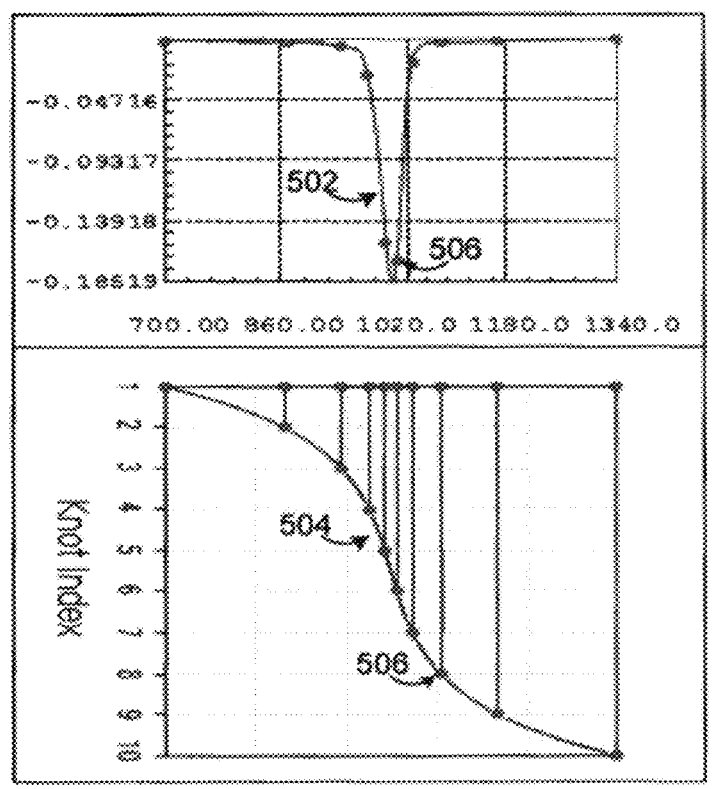

Plant nonlinearities are captured at step 406, and a final model of the plant is obtained at step 408. As discussed in detail, ordinal splines are used in this formulation. The ordinal spline bases enable the method 400 to offer an extremely flexible structure that makes very effective use of data and greatly attenuates the problems that are associated with overfitting. By placing points (knots) on a grid, a user specifies desired accuracy at desired locations. The more grid points in a region, the more accurate the calculations in that region (assuming the data is properly excited). The user can place knots wherever there are regions of significant nonlinearity. To ensure the requirement of persistent excitation, the process can be excited at a number of levels corresponding to the number of knots. An example of this is shown in FIG. 5, where an estimated pH gain curve 502 is shown along with the distribution 504 of knots 506 used to estimate the gain curve 502. The knots 506 are also projected onto the gain curve 502 itself.

Thus, the identification procedure (method 400) can be thought of as defining the operating points necessary to capture significant gain characteristics of an industrial process. Gain surfaces can be refined in an incremental fashion as more data is added to the regression.

In some embodiments, model identification during step 408 can be accomplished as follows. Pertinent step test data is gathered, and data segments for pole extraction are graphically marked. Anomalous data can be graphically marked for exclusion from the model identification process, and regression and cross-validation ranges can be graphically specified. The block structure and instrument type for the model are selected, which can be based on plant experience. Knot distributions can be graphically specified based on process understanding. At that point, a model identification procedure can be initiated to automatically perform the following tasks:
(a) Data corresponding to excluded segments and cross-validation ranges is removed.
(b) The GMS algorithm is invoked for each marked data segment and returns a transfer function matrix of ranked sub-models for each segment.
(c) Poles and delays are determined based on the transfer functions.
(d) Data from step (b) is removed.
(e) Orthonormal bases and spline bases are constructed.
(f) Various forms of Eqs. (1)-(17) are solved and nonlinear models are constructed.
(g) Infinite horizon predictions are generated based on cross-validation data if is exists or regressed data otherwise. Gain and process sensitivity plots are generated and model metrics are determined.

Based on the results, individual steps can be repeated and step testing modified as necessary to obtain models of sufficient quality for control. Note that if time constants and delays are manually specified, steps (b)-(d) can be skipped.

In particular embodiments, step testing using closed and/or open loop data is performed, such as by using a PROFIT STEPPER from HONEYWELL INTERNATIONAL INC. The step testing can be done at a nominal operating point, and signal injection may be needed and can cover the spectrum of key process dynamics. Signal amplitude can be large enough so that the signal-to-noise ratio exceeds a specified value (such as two). Linear step testing can continue until key models have a specified quality (such as rank two or better). A model structure can be selected based on process characteristics, the initial knot distribution can be based on process nonlinearities, and signal excitations can be designed based on the knot distribution and used with historical data. The knot distributions and signal excitations can be refined to converge on an accurate model.

Also, in particular embodiments, data about a process system can be collected at any suitable rate, such as once per minute. The sampling rate could be selected so that the process reaches steady-state within a specified number of intervals (such as 200). If the process' response time exceeds a threshold (such as 200 minutes), the data can be supersampled. No filtering or compression of the data may be needed. When models are created in continuous nonlinear state-space form, the sample rate used during process identification could have no bearing on the control execution interval of the controller(s) using the model. Instead, the control execution interval could be determined based on disturbance frequency and desired closed-loop bandwidth, and the default control execution interval could be one minute.

Example Results

Several case studies are presented here to show some of the structure capabilities of the various techniques presented in this patent document. Problems using Hammerstein, Weiner, and block-oriented structures are illustrated. Two problems from the open literature are given, as are two additional problems (one designed specifically to show the accommodation of nonlinear dynamics, the other to show output nonlinearities). Finally, results on plant step test data are described.

Hammerstein Model, High-Order Instruments

This case is taken directly from Chan et al., "Identification of MIMO Hammerstein Systems Using Cardinal Spline Functions," Journal of Process Control 16 (7) (2006) 659-670. It illustrates a gain inversion problem using a Hammerstein model with high-order instruments. Identical nonlinear functions, noise characteristics, and input signal excitation are used here. Static input nonlinearities for this case are given by:

$$\theta = \begin{bmatrix} f_1(u_1) \\ f_2(u_1 u_2) \end{bmatrix} = \begin{bmatrix} 3 + \dfrac{8}{1 + e^{-3u_1}} - 7 \\ f_1(u_1) * 10 * \left[ \dfrac{10u_2 + 50}{10u_2 + 51} - \dfrac{50}{51} \right] \end{bmatrix} \quad (30)$$

Figure 6:
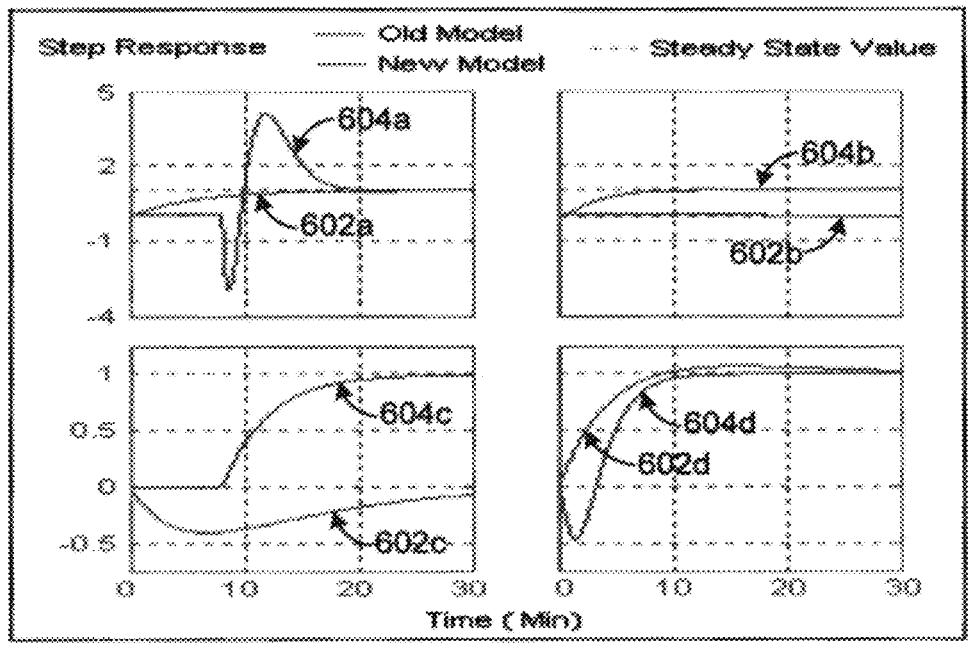

To make the problem significantly more challenging, the LTI dynamic model used in Chan et al. has been modified to include complex poles, pure time delay, non-minimum phase characteristics, and non-zero gains of off-diagonal elements. The dynamic response of the old model from Chan et al. and the new model used here are shown in FIG. 6. In FIG. 6, lines 602a-602d are associated with the old model from Chan et al., and lines 604a-604d are associated with the new model.

Figure 7:
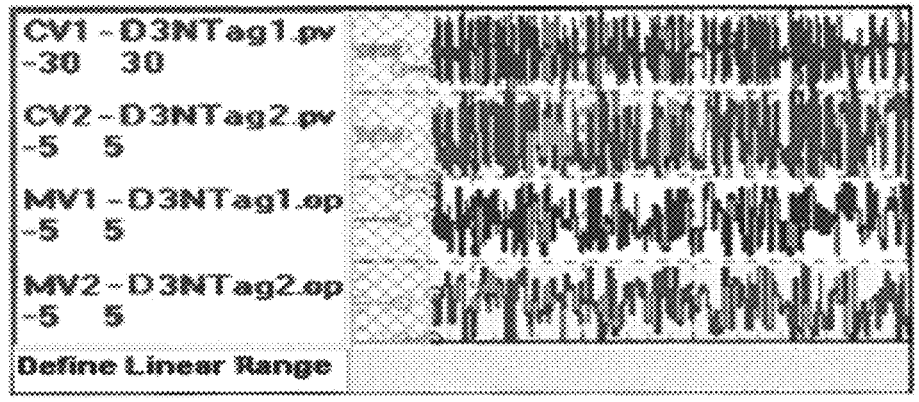

Without a priori information of the new model structure, prior approaches fail to yield a correct solution for this problem. The data for this case study is illustrated in FIG. 7. The crossed-hatched area in FIG. 7 represents conventional step test data used to determine the orthonormal bases functions. This data was not present in the original study by Chan et al. Since the dynamics are taken to be linear, only one such region is specified. The remaining data is the same as that used in Chan et al. For this case, the inputs are generated using PRMS signals. Data from the cross-hatched segment is passed to the GMS algorithm, which returns a ranked set of reduced-order transfer function matrices. Transfer function results for this data are shown in FIG. 8, which uses only the data of the cross-hatched area shown in FIG. 7.

Figure 8:
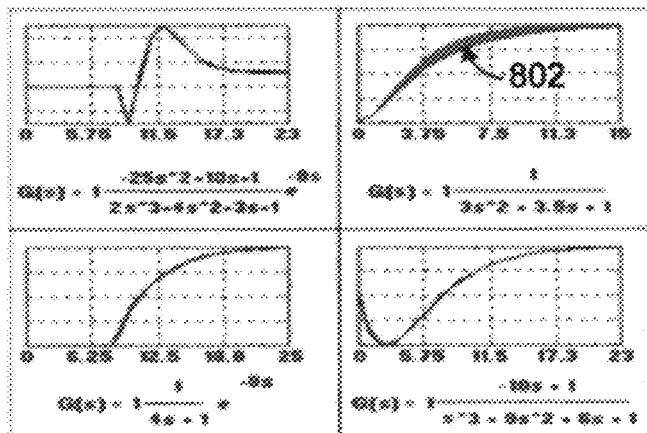

Two step response curves are shown in FIG. 8. One corresponds to the displayed transfer function, and the other corresponds to the true model shown in FIG. 6. The area 802 represents the discrepancy between the true and estimated models.

Figure 9A:
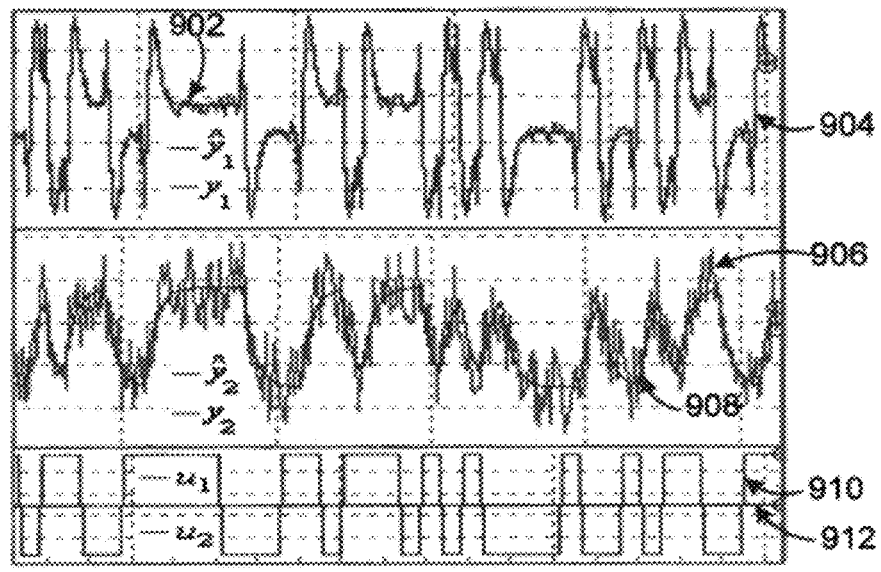
Figure 9B:
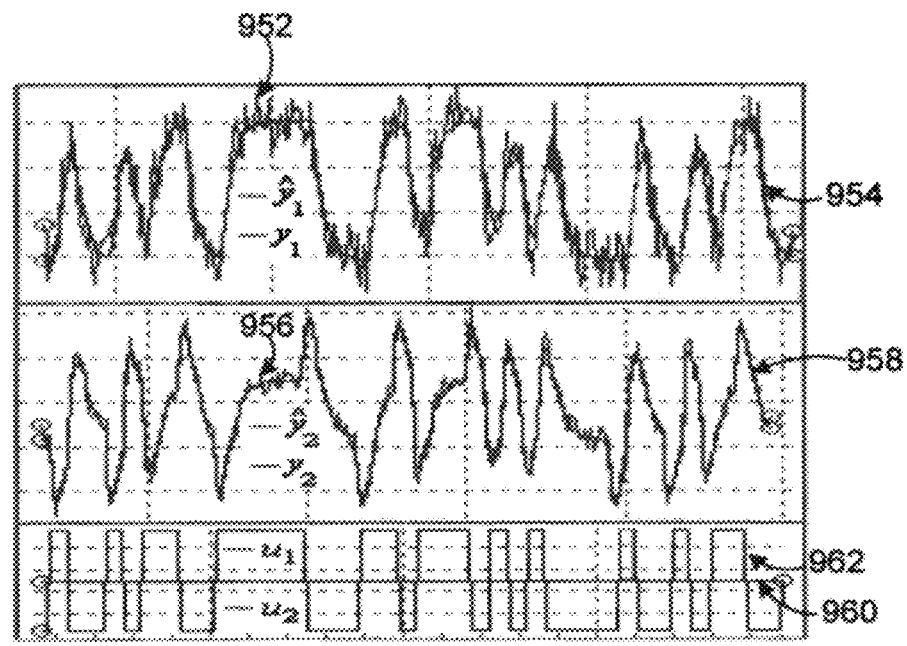

FIGS. 9A and 9B show predictions over the linear step test data. In FIG. 9A, lines 902-912 represent $y_1, \hat{y}_1, y_2, \hat{y}_2, u_1, u_2$ respectively. In FIG. 9B, lines 952-962 represent $y_1, \hat{y}_1, y_2, \hat{y}_2, u_1, u_2$ respectively. Due to the nonlinear coupling between inputs, sequential steps are performed at two operating points. The small circles in FIGS. 9A and 9B represent discontinuities in the data between points. In the first set of data in FIG. 9A, only $u_1$ was moved. In the second set of data in FIG. 9B, only $u_2$ was moved. As would be expected for these highly accurate results, all models are estimated to be high quality (rank one).

As such, each transfer function is passed from the GMS solution back to the nonlinear identification algorithm for parsing. In this case, the following seven poles are automatically extracted: $\xi=[-0.269, -0.277, -0.336, -0.440, -1.17, -0.617+0.666i, -0.717-0.666i]$. These continuous-time poles can be converted into the discrete domain and used with the time delay to create the orthonormal bases function using Eqs. (3)-(6).

At this point, the only user interaction is the specification of the data segments from which to extract the poles. To a large extent, determination of the poles can be removed from the main identification algorithm. In fact, once the poles have been estimated, an option can exist to bypass this calculation on subsequent evaluations. Success or failure of the nonlinear portion of the identification can depend on the proper specification of the spline knots. Indeed, this specification is a powerful aspect of the approach described here.

Figure 10A:
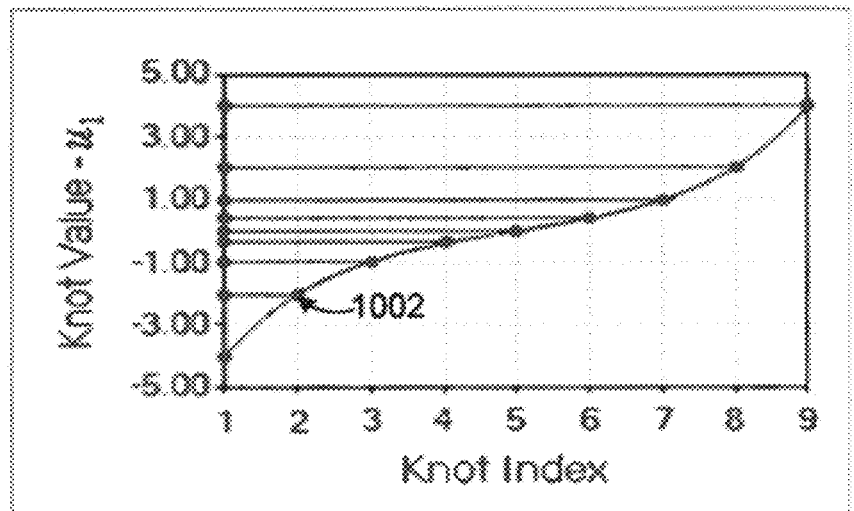
Figure 10B:
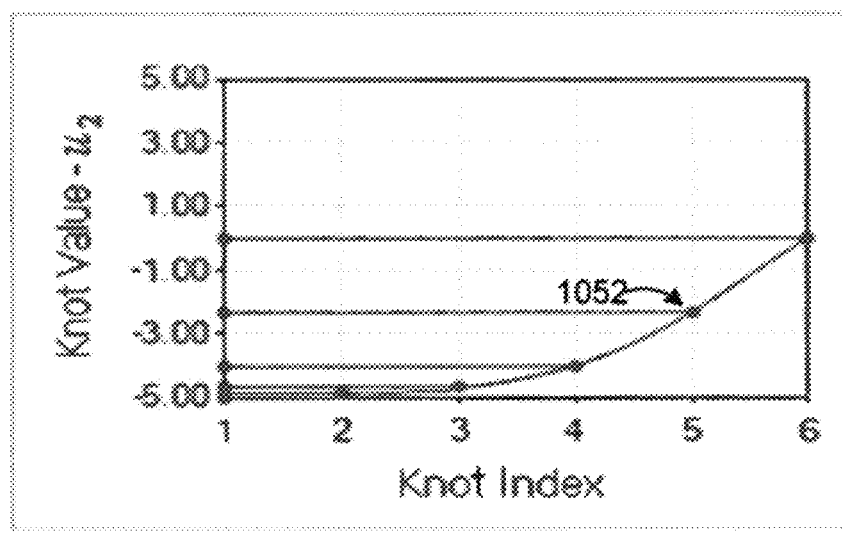
Figure 11A:
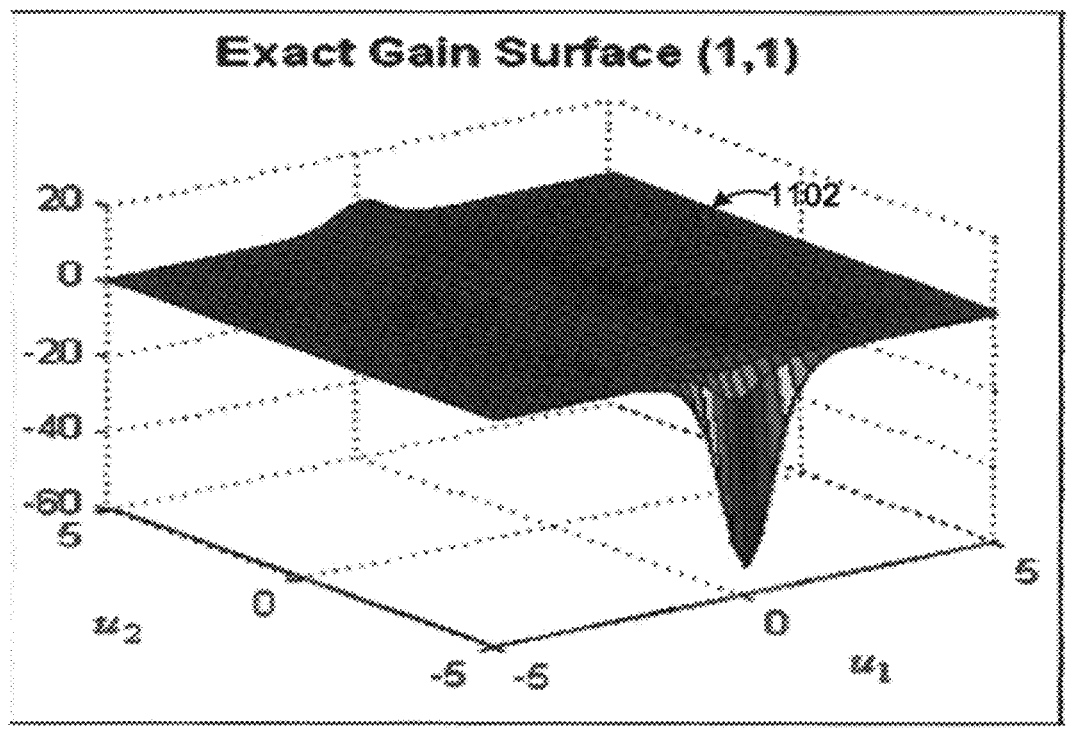
Figure 11B:
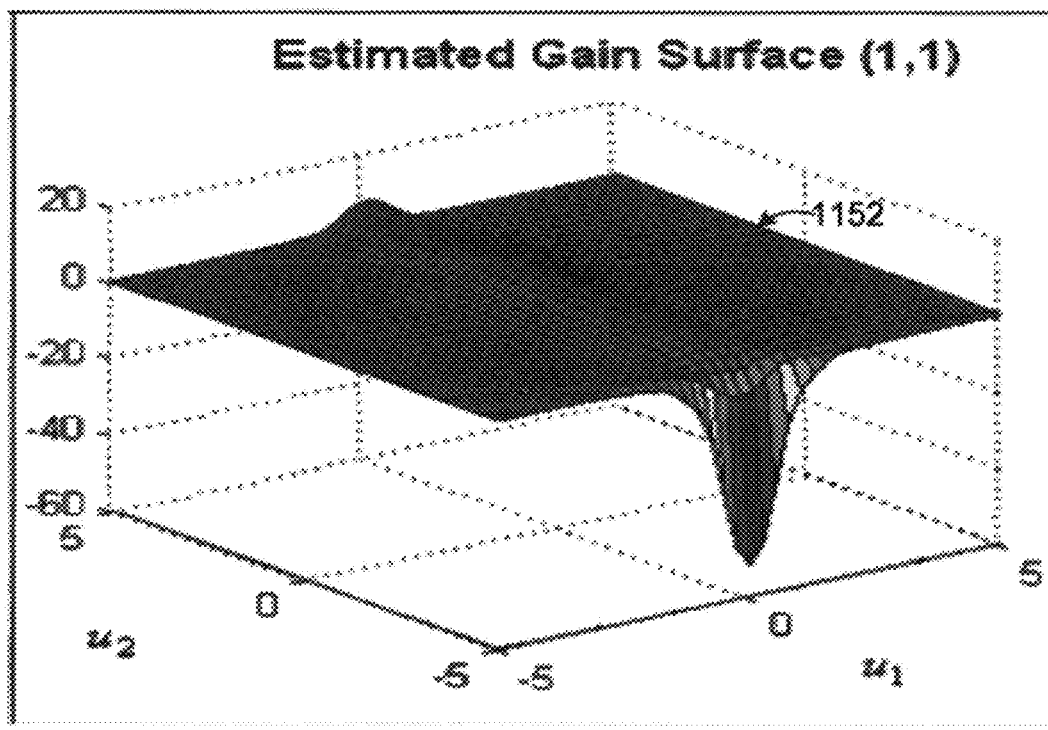
Figure 12A:
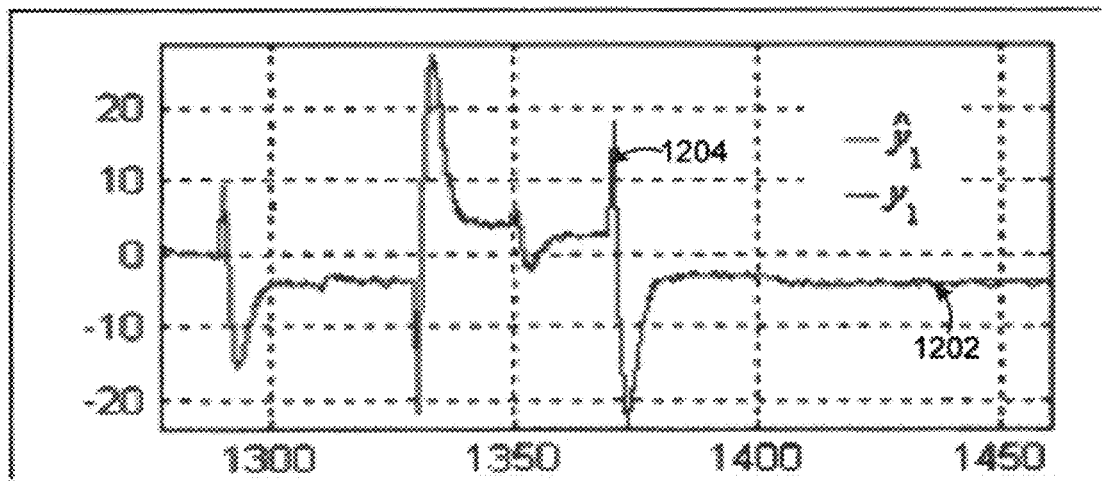
Figure 12B:
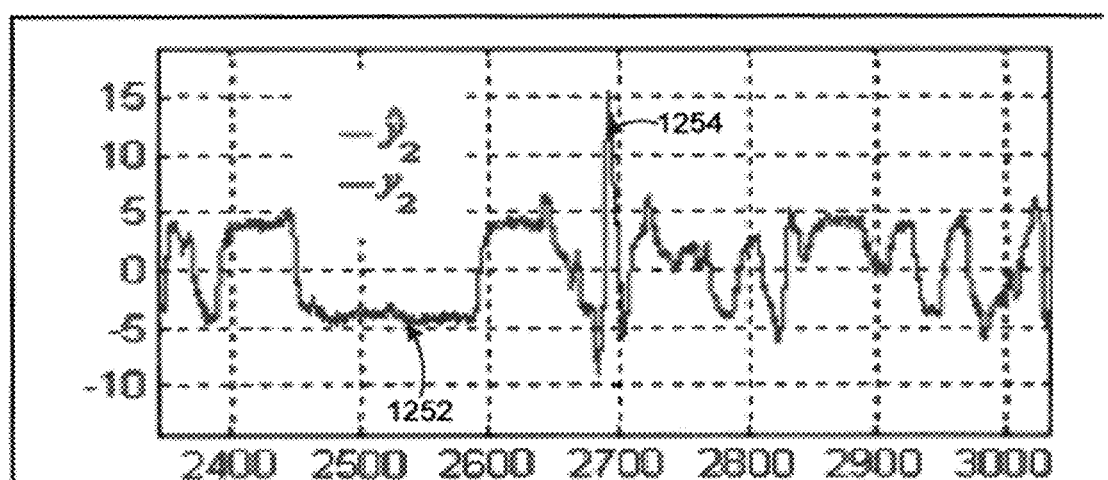

These knots can be defined in terms of points on a grid for each variable, depending on the choice of the static nonlinearity. Grids can be specified in terms of knot distributions as shown in FIGS. 10A and 10B for the two inputs of this problem. One goal here is to put more knots 1002, 1052 in areas of rapidly changing gain and less elsewhere, while at the same time using the fewest number of knots possible without losing accuracy. In some embodiments, grids can be entered graphically by manipulating specially-provided functions or by directly specifying knot positions. It is in the grid specification that a priori process information can be explicitly accounted for in the identification procedure. The importance of incorporating a priori information cannot be over stated. The results shown in FIGS. 11A, 11B, 12A, and 12B are extremely accurate due at least in part to the knot distribution specified in FIGS. 10A and 10B. In fact, if the same number of knots is used with a linear distribution, the results might be unacceptable. In FIGS. 11A and 11B, actual and estimated gain curves 1102, 1152 are shown. In FIGS. 12A and 12B, lines 1202 and 1252 represent $y_1$ and $y_2$, and they are very closely matched to lines 1204 and 1254 representing $\hat{y}_1$, and $\hat{y}_2$.

It is obvious from the gain curves 1102 and 1152 of FIGS. 11A and 11B why the knot distributions are specified as they are in FIGS. 10A and 10B. In the $u_1$ direction, it can be seen that the gain is zero over a large portion of the surface. However, the gain changes dramatically between $-1 \leq u_1 \leq +1$. In fact, there is an obvious gain inversion as the gain goes from $-53$ to $+6$. In the $u_2$ direction, the gain is largely uniform over the surface up to $u_2 \leq -3$, at which point it changes rapidly.

These characteristics are reflected directly in the knot distributions. The plot in FIG. 10A shows the grid used for $u_1$, and the plot in FIG. 10B shows the grid used for $u_2$. The ordinate in these plots corresponds to the span or range of the corresponding variable. In FIG. 10A, nine knots 1002 have been selected with a dense distribution between $-1$ and $1$. This corresponds to the region where the gain is changing rapidly. In FIG. 10B, there are only six knots 1052, and four of those are located between $-4$ and $-5$. Note that for the input $u_2$, the knots 1052 only span half the range ($-5$ to $0$), yet the results over the entire range are still very accurate. This is a direct consequence of the use of the ordinal splines. As shown in FIG. 3, the splines have very nice properties at the grid boundaries. Hence, since the gain surface is not changing for $u_2 > 0$, there is no reason to include extraneous knots in this region. The implication here is significant, as each knot imposes an increased demand on information content in the data.

Nonlinear Dynamics

For this case, a very simple model is constructed to show that the formulation presented here can accommodate nonlinear dynamics. The basic model can be expressed as:

$$\dot{x} = -\frac{1}{\tau(u)}x + \frac{g(u)}{\tau(u)}; \quad g(u) = \frac{\beta\left(e^{\frac{P_g u'}{\gamma}} - 1\right)}{e^{P_g} - 1} + g_{lo} \quad (31)$$

$$\tau(u) = \frac{\alpha\left(e^{\frac{P_\tau u'}{\gamma}} - 1\right)}{e^{P_\tau} - 1} + \tau_{lo}; \quad k(u) = \frac{\beta P_g e^{\frac{P_g u'}{\gamma}}}{\gamma(e^{P_g} - 1)}$$

$$y = x$$

Constants and variables used in the model can be defined as follows:

$$\alpha = \tau_{hi} - \tau_{lo}; \; \beta = g_{hi} - g_{lo}; \; \gamma = u_{hi} - u_{lo}$$

$$u' = u - u_{lo}; \; P_g = 4; \; P_\tau = 4; \; \tau_{hi} = 50; \; \tau_{lo} = 5$$

$$g_{hi} = 200; \; g_{lo} = 1; \; u_{hi} = 12; \; u_{lo} = 1 \quad (32)$$

Figure 13:
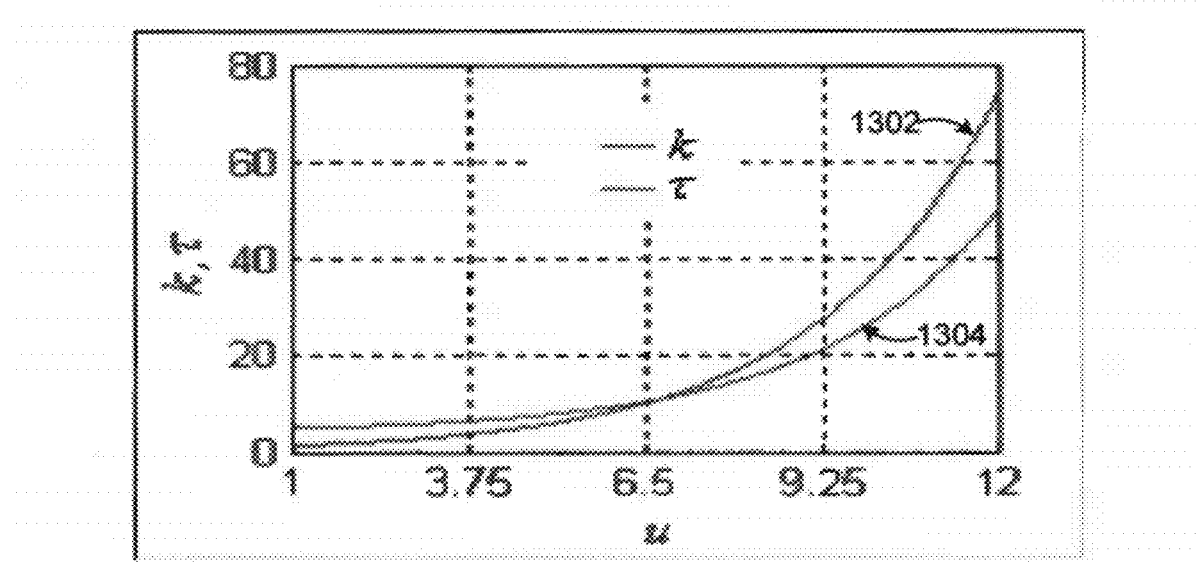

A Hammerstein model is arbitrarily chosen to fit this data. The model is excited using a PRBS signal at five equally-spaced values of the input $\{1, 3.75, 6.5, 9.25, 12\}$ using an amplitude of $\pm 0.01$. The effective gain and time constant as a function of the input for this model are shown in FIG. 13 as lines 1302-1304, respectively. With this a priori information, the grid of knots 1402 can be selected as shown FIG. 14.

Figure 14:
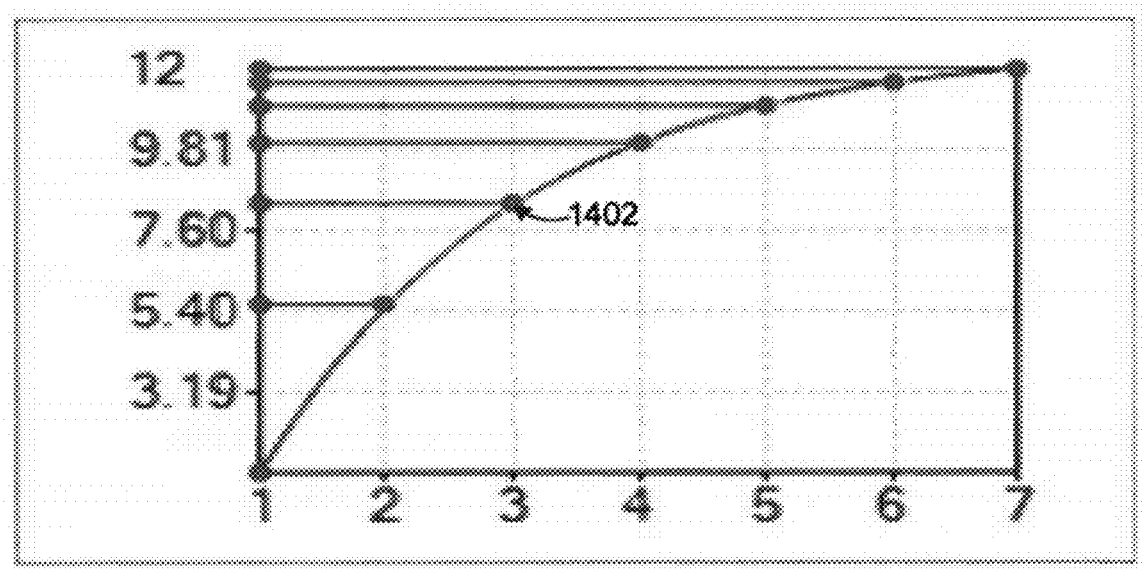

Seven knots 1402 are selected for this case as shown in FIG. 14, two more than might be theoretically recommended. Five of the knots 1402 are located between values of 8 and 12 to capture the exponential increase in the effective gain and time constant in this region. For this case, no conventional stepping is performed to estimate the dynamics at the various operating points, as this would result in an almost exact pole match for this simple model. Rather, the manual mode of the identifier is used to specify a range of poles.

In the manual mode, the user actually inputs a range of expected time constants, which are internally converted to the required poles. In general, the user is free to specify any number of time constants up to an internally-specified limit, and the time constants can be chosen to span the expected range of the process. As shown in Table 2, the user-specified time constants contain a considerable error.

TABLE 2

| Pole Definition | | | | | |
| --- | --- | --- | --- | --- | --- |
| u | 1 | 3.75 | 6.5 | 9.25 | 12 |
| True τ | 5 | 6.44 | 10.36 | 21.02 | 50 |
| User τ | 5 | 25 | 38 | 45 | 50 |

True τ values in Table 2 are taken from the effective time constant expression defined in the model ($\tau(u)$). Here, only five were chosen to match the five operating points. In spite of the significant errors in the user-specified time constants, FIG. 15 illustrates that the nonlinear variation in the dynamics has been well modeled.

Figure 15:
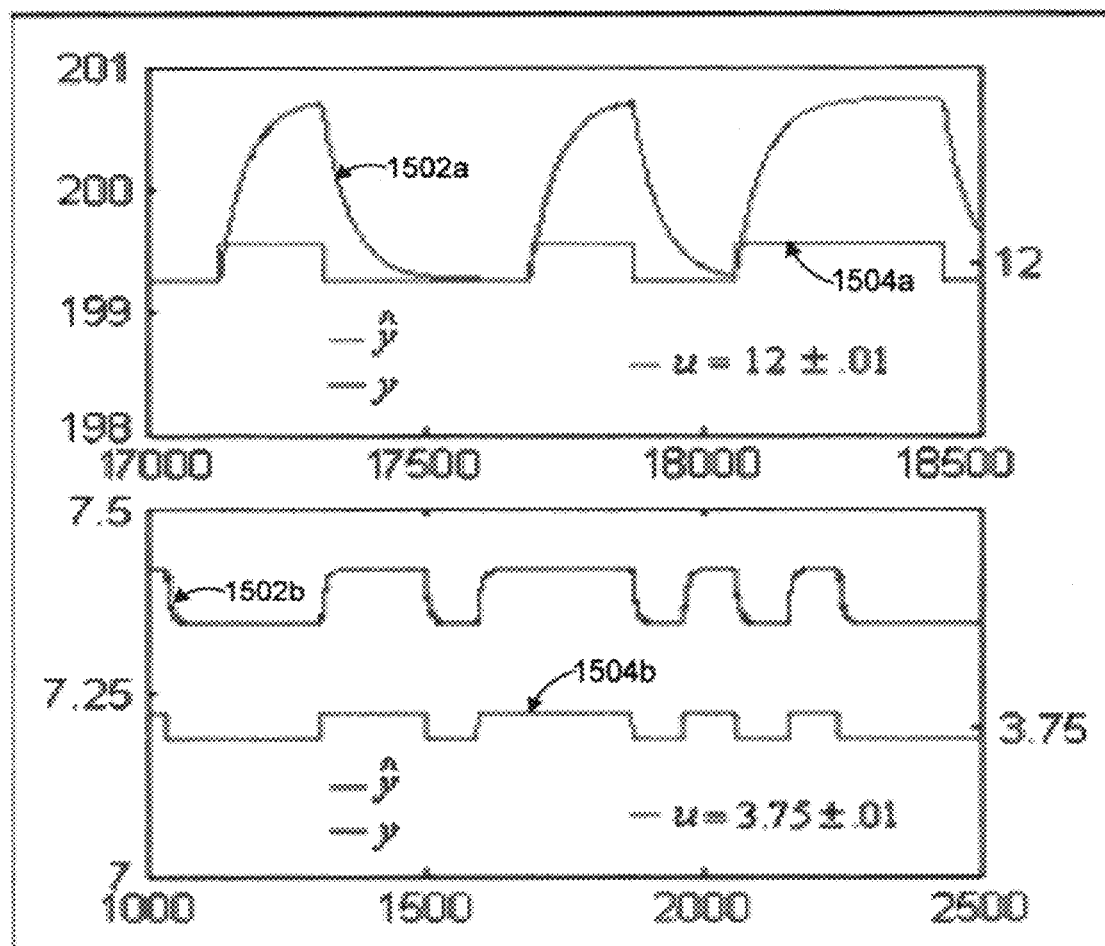

FIG. 15 shows the predicted and actual dynamic response for the two nominal operating points of u=3.75 and u=12. In FIG. 15, lines 1502a-1502b represent the closely matched y and ŷ signals, while lines 1504a-1504b represent the two u signals. The time scale for both cases is identical and spans 1,500 minutes. The significant impact of both the effective gain and time constant are self-evident from FIG. 15. For the constants used in the model, the effective gain varies from 1 to 75, while the effective time constant varies from 5 to 50.

Figure 16:
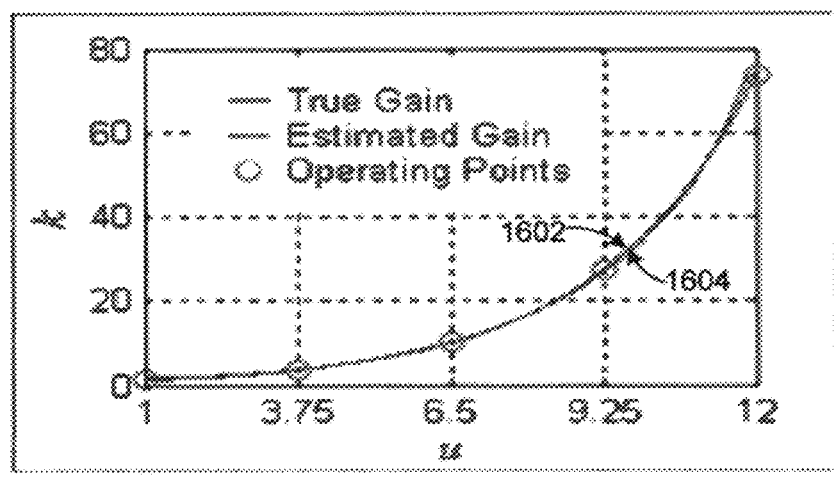

Results in terms of the effective gain are shown in FIG. 16, which has a line 1602 representing the true gain and a line 1604 representing the estimated gain at different operating points. Although data is only available at the operating points, the estimated gain curve is internally calculated in the identification process and illustrates how the gain can vary over the entire operating domain.

It is worth mentioning that the simple model presented here is not intended to represent a physical process but rather to show that nonlinear dynamics can be effectively modeled using the bases functions described above. That the variations in the effective gain and time constant depicted in FIG. 13 are at least somewhat reasonable can be corroborated by referring to Pearson et al., "Gray-Box Identification of Block-Oriented Nonlinear Models," Journal of Process Control 10 (2000) 301-315, which analyzes a distillation column that exhibits output multiplicity under certain conditions. For the case of the high bifurcation point, Pearson et al. plot the effective gain and time constant as a function of the mass reflux. The exponential function of these curves is quite similar to the functions shown in FIG. 13. The main difference is that the functions decrease as the mass reflux increases in Pearson et al. The effective time constant varies from 2.5 to 34, while the effective gain varies from 0.1 to 1.75.

Wiener Model

As output nonlinearities are used here, the solution may involve iteration. Although the method is unbiased, it is useful to see the effect of noisy measurements and discontinuous data. The following SISO model is used for this case:

$$\hat{\omega} = \frac{1}{2s^2 + 3s + 1}u'; \quad v = \frac{\alpha}{9.4912s + 1}; \quad \alpha = \frac{\text{var}(v)}{\text{var}(y)} = 7\% \quad (33)$$

$$y = \omega + 2\omega^3 + c; \quad \omega = \hat{\omega} + v; \quad u' = u - 11; \quad c = 20$$

In the setup for this problem, eight knots are linearly distributed over the output range, which varies between 11 and 52. Since this is an output nonlinearity, a PRMS signal is used, which has a minimum and maximum value of 9 and 13, respectively. As can be seen from the problem statement, the disturbance to output power is 7%. This simple case only takes three iterations to converge. Also, the predictive performance is good as illustrated in FIG. 17, which shows lines 1702-1704 representing y and ŷ, respectively.

Figure 17:
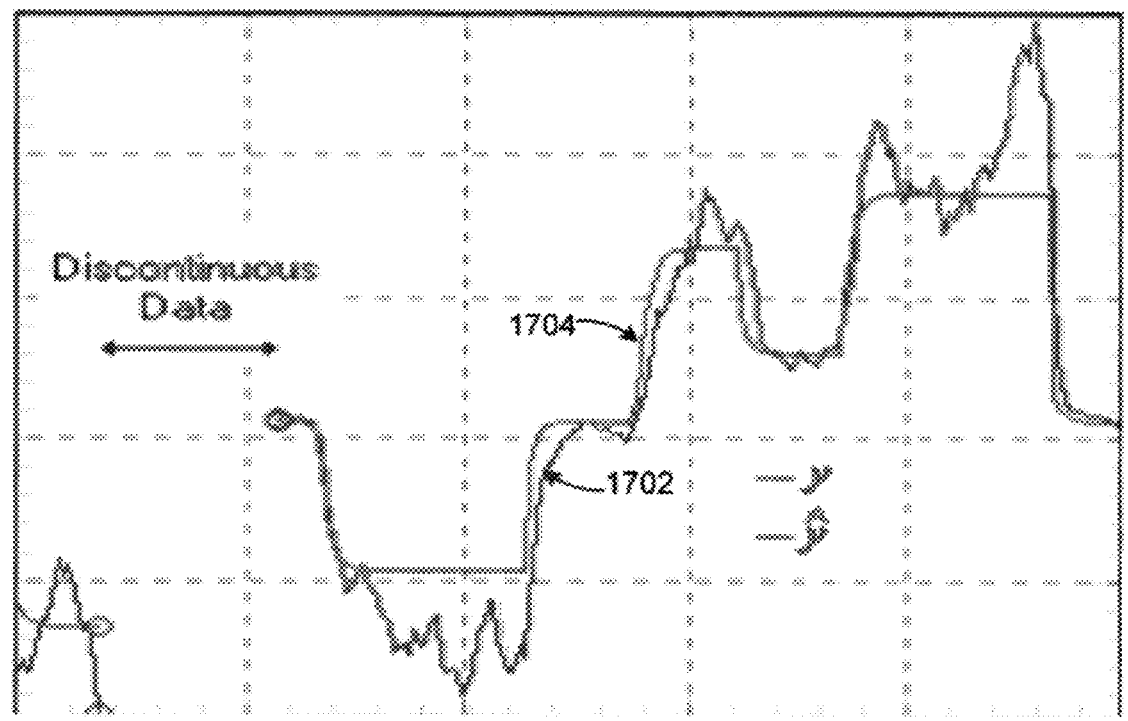
Figure 18:
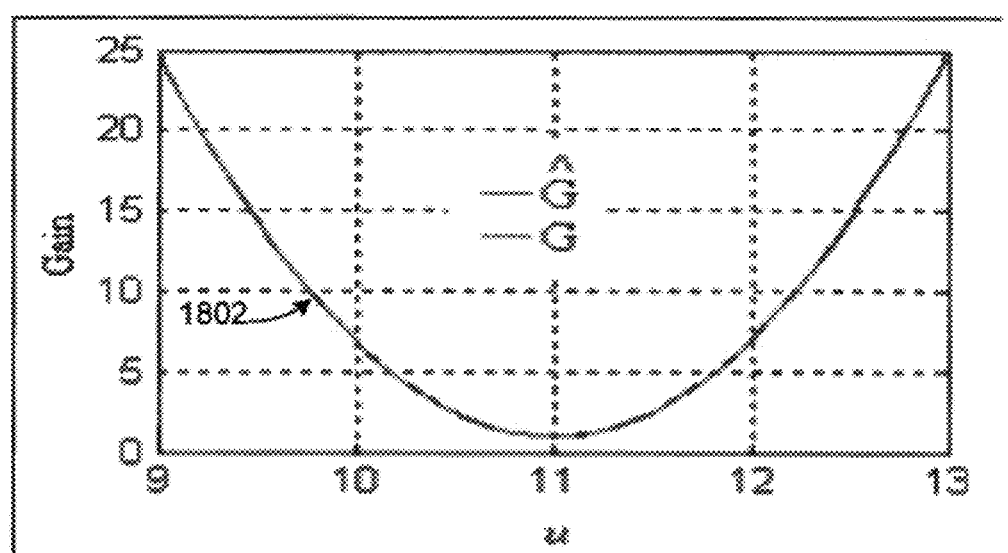

Another aspect depicted in FIG. 17 is the fact that the data is discontinuous. Being able to deal with discontinuous and bad (NaN) data may be a requirement of any method to be used for industrial deployment. It is the extremely rare case where all data collected for any identification is contiguous. In fact, even in the rare cases where it is contiguous, often data needs to be excluded from the identification for one reason or another. This requirement results in discontinuous data being used for regression. To accommodate these conditions, the orthonormal bases function filters can calculate initial conditions after each discontinuity. In addition, these filters can explicitly deal with the fact that bad data (NaN) can appear anywhere in the data set. An almost exact replication of the gain curve is obtained for this process as illustrated in FIG. 18, where lines 1802 representing G and Ĝ overlap over virtually their entire length. A similar replication of the LTI dynamics is also obtained although not displayed.

As described previously, a primitive successive substitution method can be used to determine ω. Alternate Newton formulations can also be constructed and used (although the numerical gradient calculation of the bases functions may not be justified). Iterations are well-behaved due to good initial conditions (ω=y) and the fact that all regression calculations are solved as simple least squares problems. While the iteration count is a function of the complexity of the output nonlinearity (high-order output instruments for multiple outputs), it is nevertheless well-behaved in the sense that the loss function decreases monotonically. The maximum number of observed iterations to date is less than forty.

N-L-N Model

Figure 19:
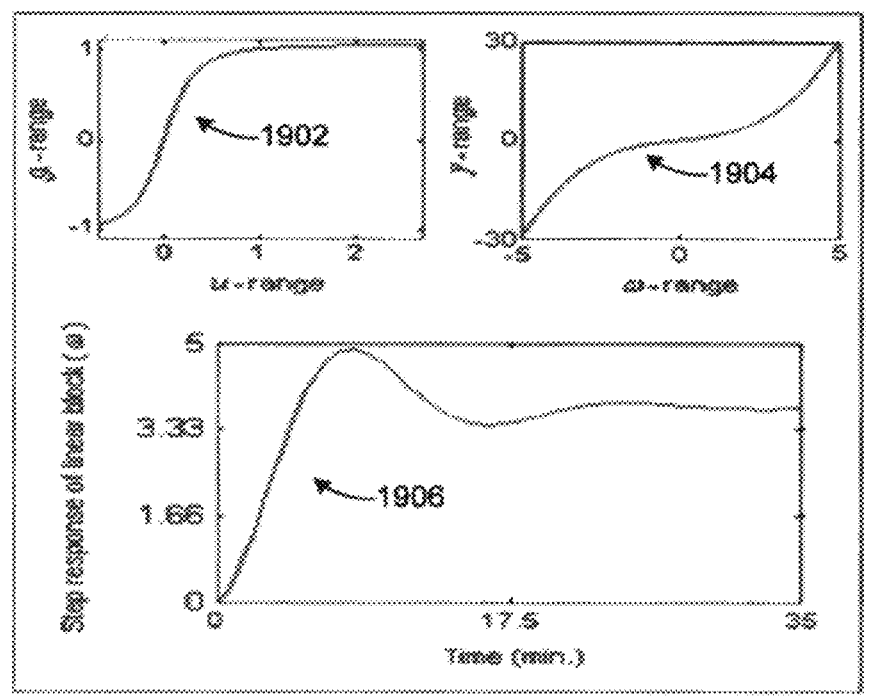
Figure 20:
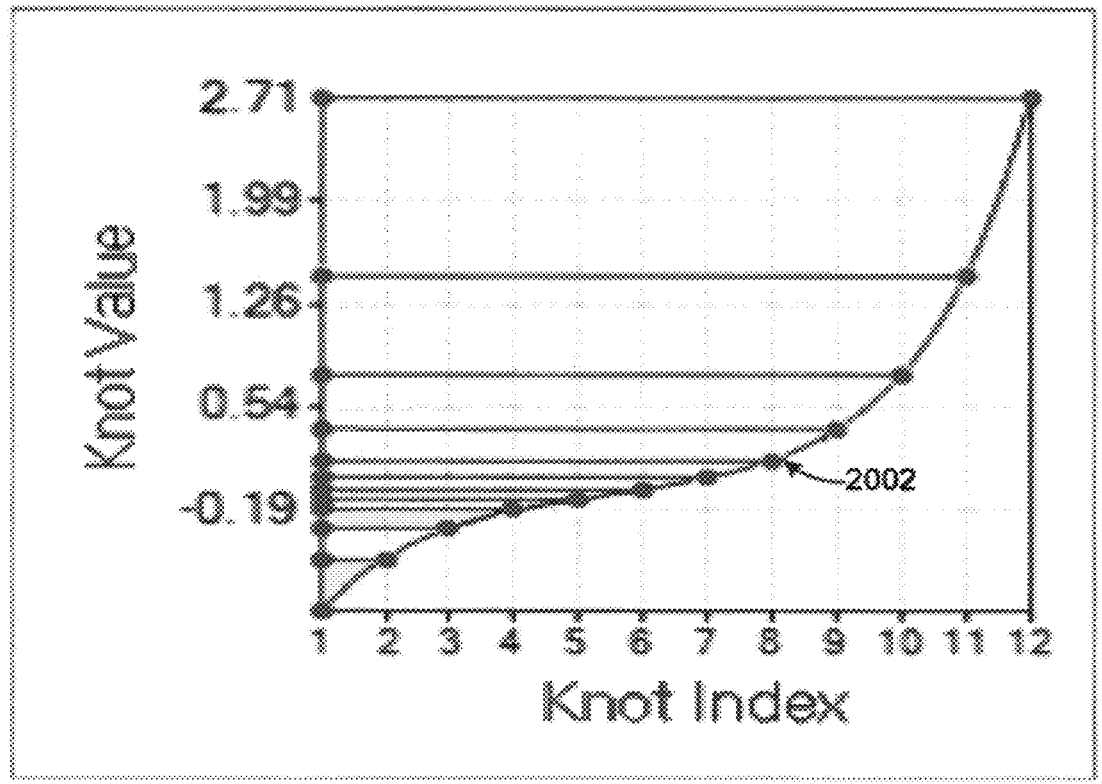

An exact copy of the model described in Zhu, "Estimation of an N-L-N Hammerstein-Wiener Model," Automatica 38 (9) (2002) 1607-1614 is used here. The input, dynamic, and output blocks are given by:

$$\theta = \frac{u}{\sqrt{.1 + .9u^2}}; \quad \omega = \frac{.5325s + 3.75}{4.12s^2 + 1.47s + 1}\theta; \quad y = \omega + .2\omega^3 \quad (34)$$

and the domain of interest is −0.75≤u≤2.75. Functional forms of the N-L-N blocks are illustrated in FIG. 19 for the stated input range. It can be seen that there is an input saturation nonlinearity 1902, a cubic output nonlinearity 1904, and an under-damped LTI block 1906 whose gain is 3.75. For the range of inputs specified, ω (the input to the output nonlinearity) varies from −5 to +5. Twelve knots are used for both input and output bases functions in an attempt to recover an accurate estimate of the gain curve. The output knots are distributed linearly and therefore not displayed. The distribution of knots 2002 for the input is shown in FIG. 20.

Figure 21:
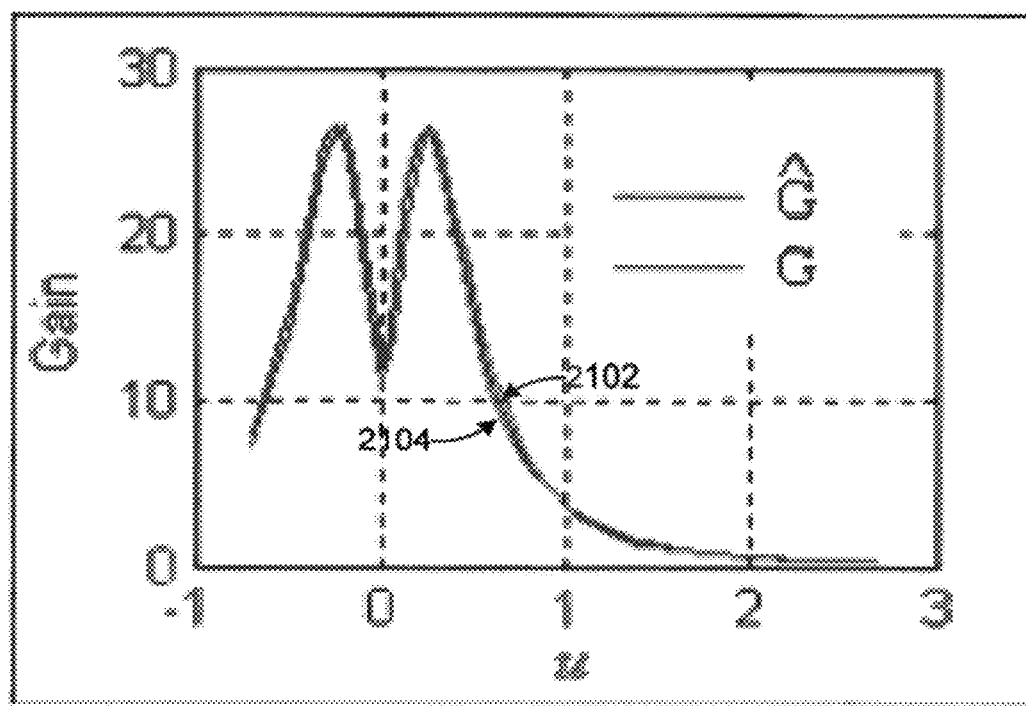

Excitation for this process can be achieved by first using a PRBS signal of amplitude ±0.01. Perturbations can be performed at sufficient operating points spanning the input range to ensure sufficient information content in the data for the specified knot selection. An almost exact replication of the gain curve is obtained for this process as illustrated in FIG. 21, where lines 2102-2104 represent G and Ĝ, respectively. A similar replication of the LTI dynamics is also obtained although not displayed. Observation of the gain curve illustrates why the knots 2002 are specified as shown in FIG. 20. The dense packing of knots between ±0.2 is used to capture the double hump in the gain that occurs at u=0.

Cross-validation using small amplitude steps yields equally accurate predictions. One problem, however, is that the effect of the output nonlinearity may not be adequately captured using a PRBS signal, no matter how many levels are included. As discussed previously, the output nonlinearity results in a dynamic response that is a function of the input amplitude. The effect is to make the zeros of the LTI block appear as if they change as a function of the input. To demonstrate this result, an additional model using a PRMS excitation signal can be built. The two models are compared using a cross-validation set of data based on a PRMS signal. Results of this test are shown in FIGS. 22A and 22B.

Figure 22A:
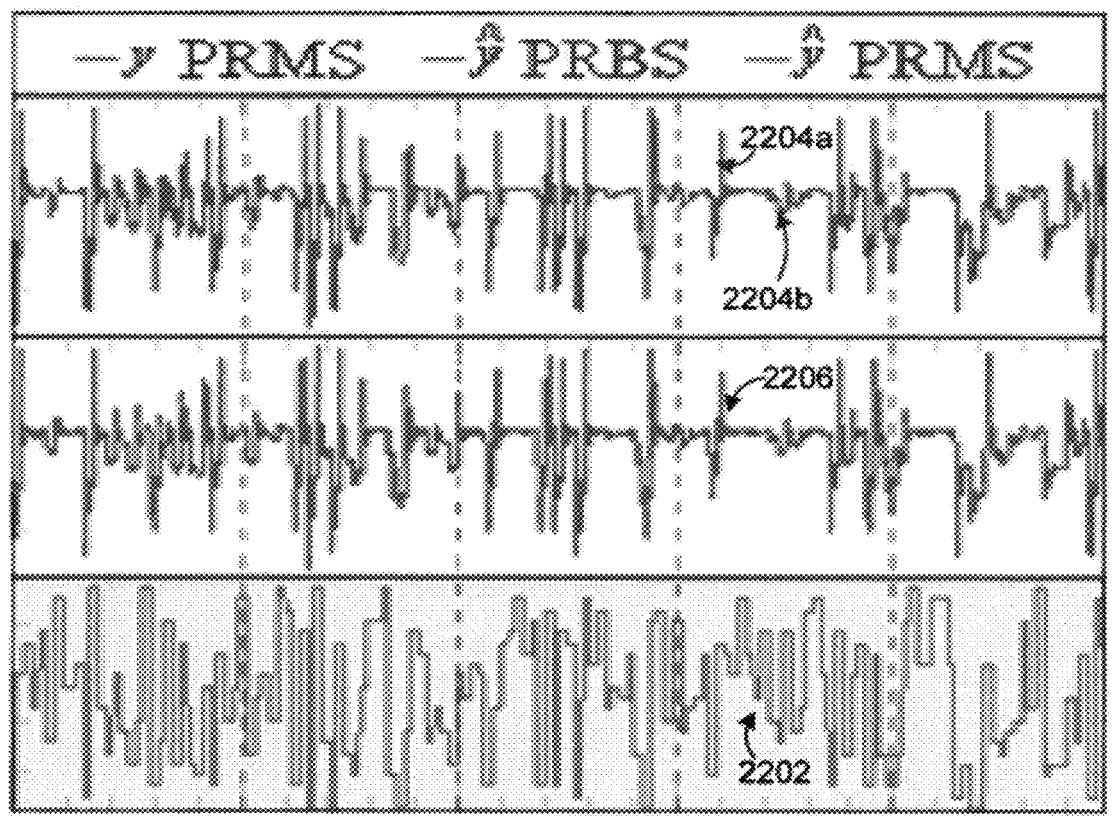
Figure 22B:
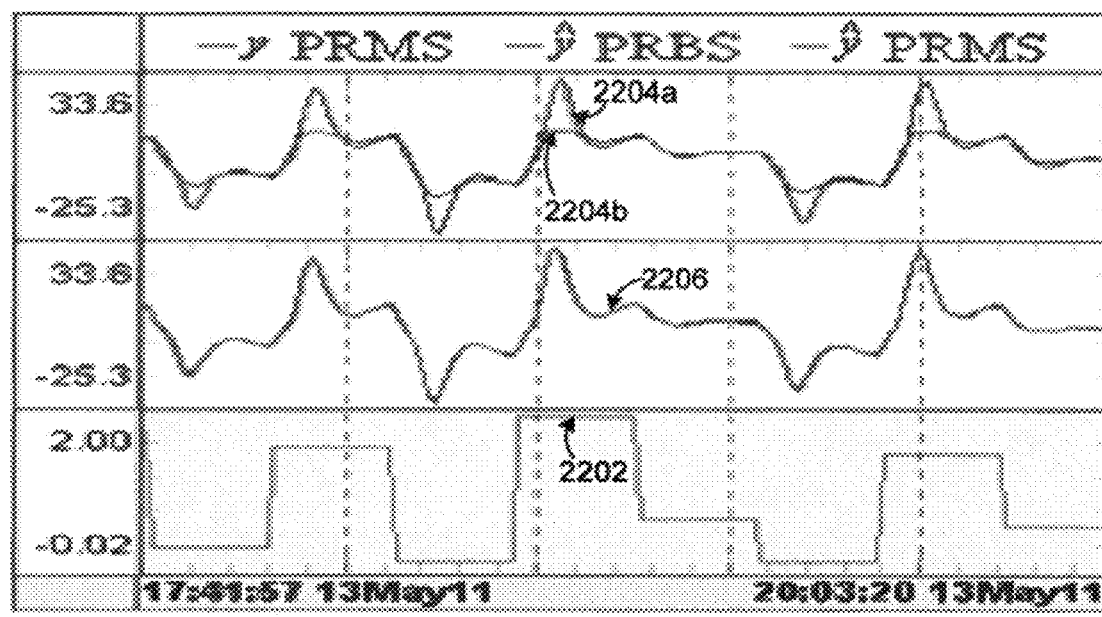

Three sets of curves are displayed in FIG. 22A, a portion of which is shown in FIG. 22B. The bottom curve 2202 is the cross-validation PRMS input used for prediction. The top curves 2204a-2204b show the response of the process y and the predictor ŷ for the PRMS input, respectively. The model used for this prediction is the one based on the multi-level PRBS signal described initially. In spite of the almost exact gain and LTI dynamics, the predictions are unacceptable, as this model has failed to capture the output nonlinearity. The middle curves 2206 illustrate dramatically improved performance. In this case, a PRMS signal is used to re-identify the model. This model now captures the output nonlinearity, and an almost exact replication of the process output is recovered. Note that while the efficacy of the PRMS signal is obvious, a concern could exist as to its acceptance under plant conditions. Massive changes over operating input ranges may almost never be tolerated, even for a single input. Trying to do so simultaneously for multiple inputs (high-order instruments) may be out of the question in some situations.

Null Sub-Model

For this test case, the true dynamic sub-model structure is given by the following matrix expression.

$$\begin{bmatrix} \frac{(-24.85s^2 + 10.38s + 1)e^{-8s}}{2.06s^3 + 4.45s^2 + 3.43s + 1} & 0 & \frac{(-3s + 1)e^{-5s}}{s^2 + 2s + 1} \\ \frac{1}{3s + 1} & \frac{-3s + 1}{s^3 + 3.5s^2 + 3.5s + 1} & 0 \end{bmatrix} \quad (35)$$

Here it can be seen that there are null models in the (1,2) and (2,3) positions. The nonlinear characteristics are given as:

$$\theta = \begin{bmatrix} f_1(u_1) \\ f_2(u_1 u_2) \\ f_3(u_3) \end{bmatrix} = \begin{bmatrix} -4 + \dfrac{8}{1+e^{-3u_1}} \\ f_1(u_1) * 10 * \left[ \dfrac{10u_2 + 50}{10u_2 + 51} - \dfrac{50}{51} \right] \\ 2u_3 \end{bmatrix} \quad (36)$$

Figure 23:
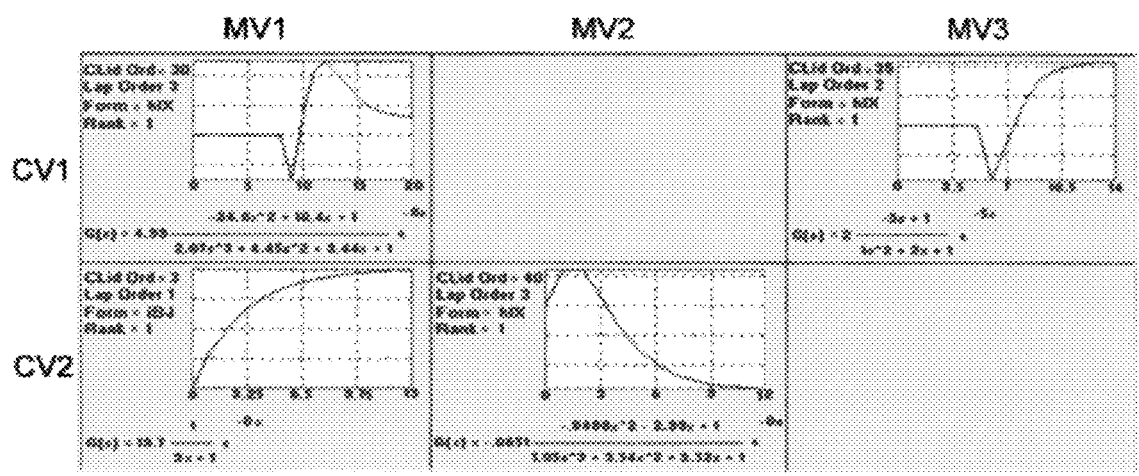

Note that the last instrument ($f_3$) is linear, so the final nonlinear model has a constant gain of two for the (1,3) element. The GMS results for this case are shown in FIG. 23. These are the results of stepping the nonlinear model using small perturbations.

Figure 24A:
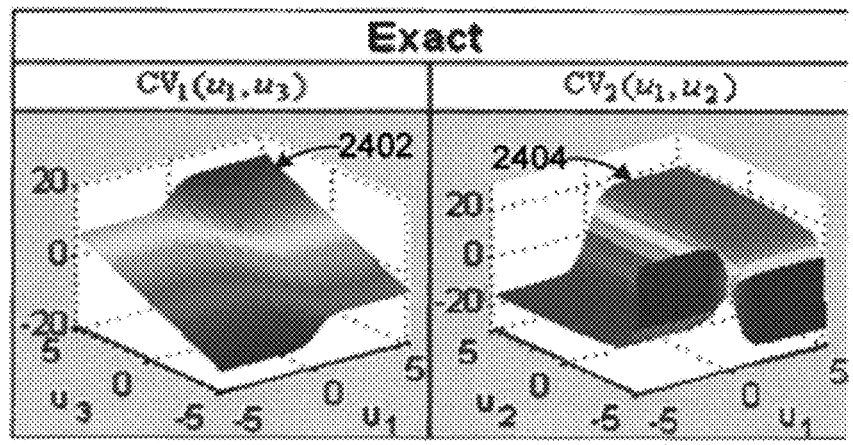
Figure 24B:
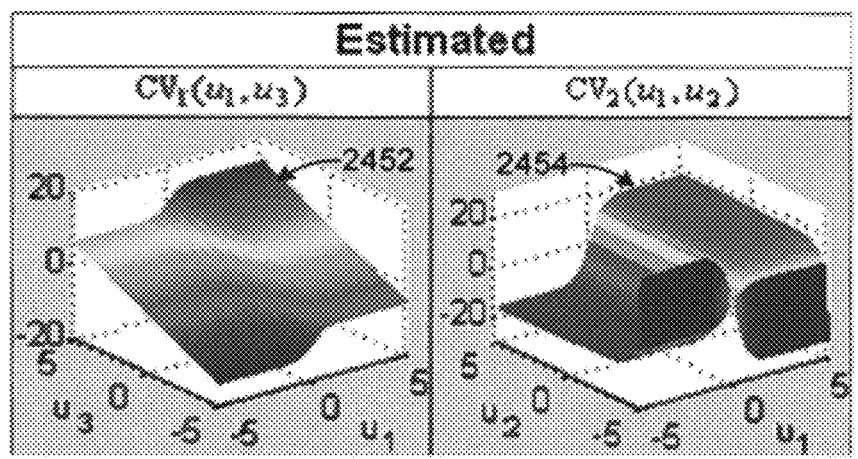
Figure 25:
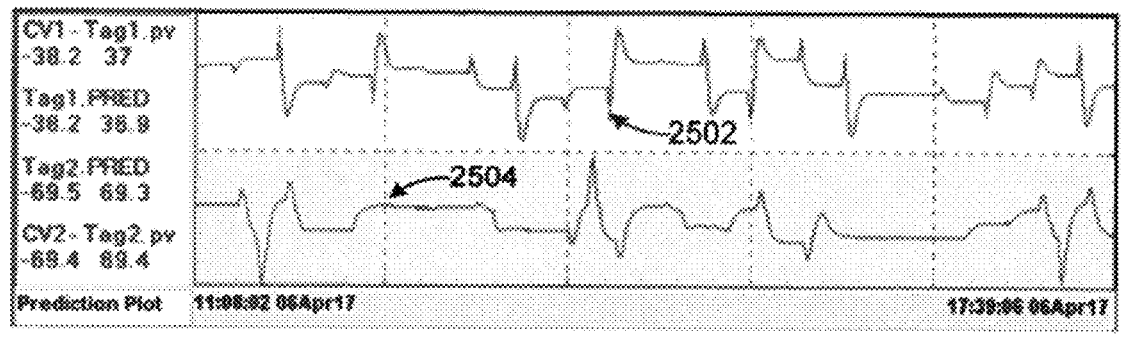

As shown in FIG. 23, CV1 is only a function of MV1 and MV3. Similarly, CV2 is only a function of MV1 and MV2. Surfaces 2402-2404 of these functions at steady state are shown in FIG. 24A for the exact models, and surfaces 2452-2454 of these functions at steady state are shown in FIG. 24B for the estimated models. FIGS. 24A and 24B show the nonlinear functions are well represented by the estimated model. FIG. 25 shows that the models can be used to accurately predict CV1 and CV2. In particular, lines 2502 show predicted and actual values for CV1, and lines 2504 show predicted and actual values for CV2.

Figure 26A:
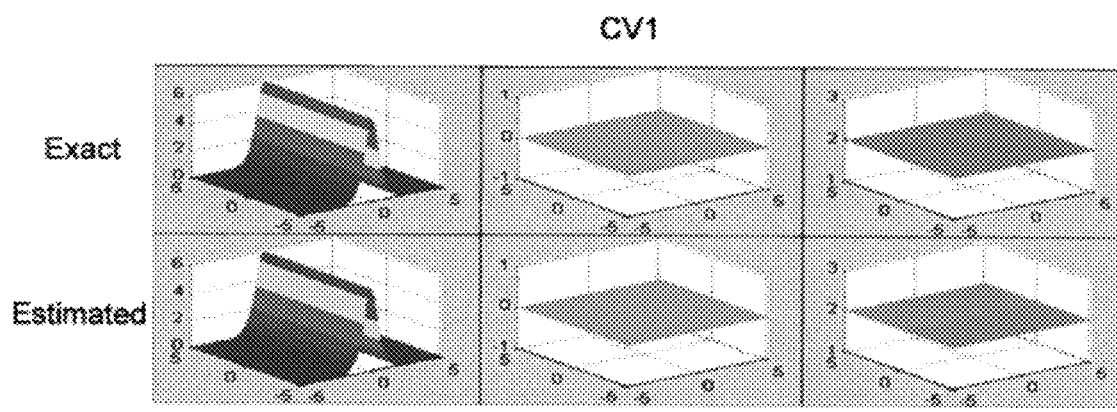
Figure 26B:
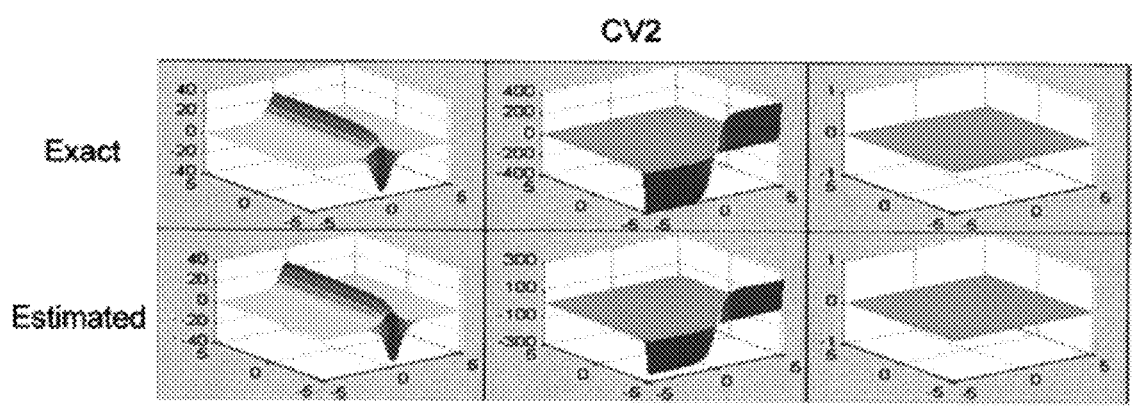
Figure 27:
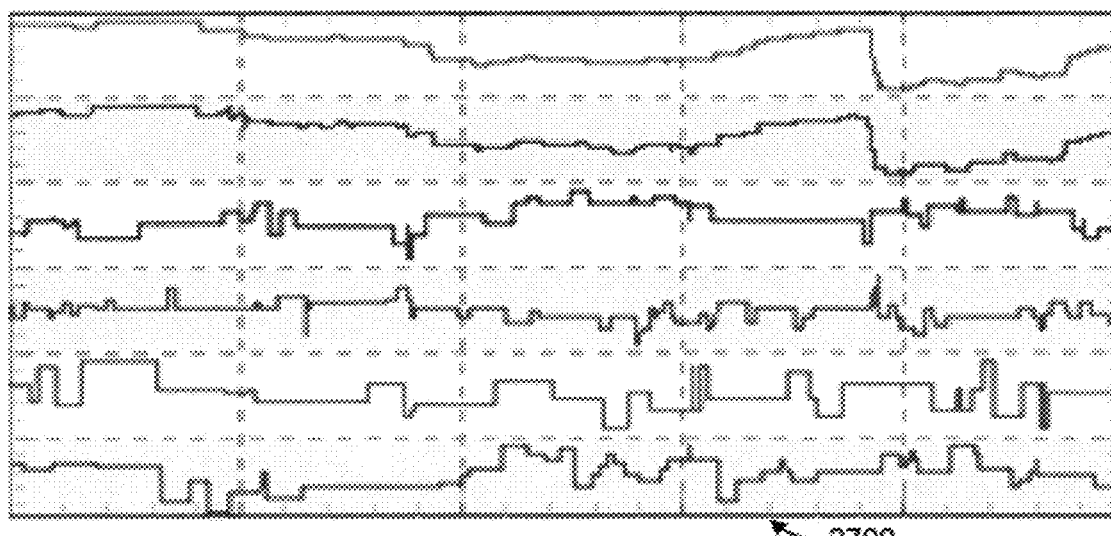

Since the real accuracy of any model depends on its gains, it is also useful to investigate these properties. FIGS. 26A and 26B show the exact and estimated gains for CV1 and CV2, respectively. FIG. 26A shows the exact and estimated gains for CV1, while FIG. 26B shows the exact and estimated gains for CV2. It can be seen that the gain surfaces match almost exactly. The only discrepancy occurs for element (2,2). In this case, the gain is changing so rapidly at the $u_2$ boundary that the knot distribution (shown in FIGS. 10A and 10B) is unable to capture this gradient. However, increasing the knot density in this region can solve this problem.

Air Separation Unit—Plant Step Test Data

In this last case, plant step test data is used to build nonlinear models for an air separation unit. Units and tag names are to be displayed. As is typical during plant step testing, data is collected for many variables. Of these variables, only nine controlled variables (process outputs), ten manipulated variables (process inputs), and three measurable disturbance variables are considered as realistic candidates for building the model.

As is true in many cases, step testing is highly constrained to avoid plant trips. In this case, the testing proceeds in a manual fashion without the ability to perform on-line identification. After data analysis and preliminary model building, the variable set is paired down to six controlled variables, six manipulated variables, and two disturbance variables. Manipulated variables step data 2700 for building the model is presented in FIG. 27.

Figure 28:
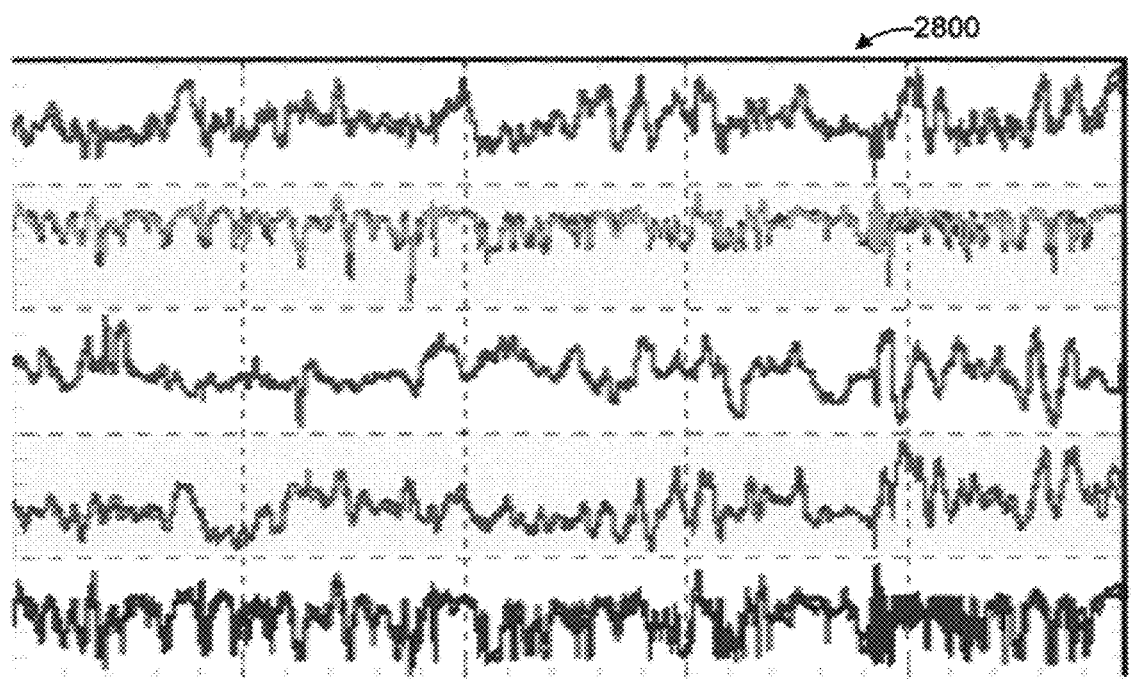

A Hammerstein model with first-order instruments is selected due to data limitations. Since there is little a priori knowledge on nonlinear structure, linear knot distributions are chosen for all input variables. To avoid data sensitivity, a minimum number of knots (four) is used. Predicted and actual data 2800 for the nonlinear model is shown in FIG. 28. These predictions are the result of many model parameter perturbations and the a priori knowledge that parts of the process take four to six hours to settle. With these slow poles, it may be impractical to perform conventional step tests at multiple operating points. Therefore, as described above, a range of process poles can be manually entered based on plant experience.

Performance metrics corresponding to five controlled variable predictions shown in FIG. 28 are given in Table 3.

TABLE 3

| | CV Metrics | | |
|---|---|---|---|
| CV | CV Rank | R2 | Percent Fit |
| CV1 | 2.048289 | 0.8627567 | 66.16354 |
| CV2 | 2.859783 | 0.7410325 | 52.29426 |
| CV3 | 1.109895 | 0.9590105 | 83.09006 |
| CV4 | 2.076176 | 0.8585736 | 63.68795 |
| CV5 | 2.141464 | 0.8487805 | 67.75055 |

The CV rank is a heuristic metric that indicates the expected control performance quality of a given controlled variable. In this example, the rank metric ranges between one and five, with one being the highest quality and five being the lowest quality. Rank three may be the lowest value recommended for online control. R2 is the square of the conventional correlation coefficient between the actual and predicted controlled variables. Percent fit (PF) is defined as PF=(1−e)·100, where e is given as:

$$e = \dfrac{\sum_{k=1}^{N} (y_k - \hat{y}_k)^2}{\sum_{k=1}^{N} (y_k - \hat{y}_k)^2} \quad (37)$$

In the preceding expression, $\tilde{y}_k$ represents the mean value of $y_k$, and $\hat{y}_k$ represents the infinite horizon prediction. Table 3 indicates that only CV2 should be considered as questionable for online control.

Figure 29:
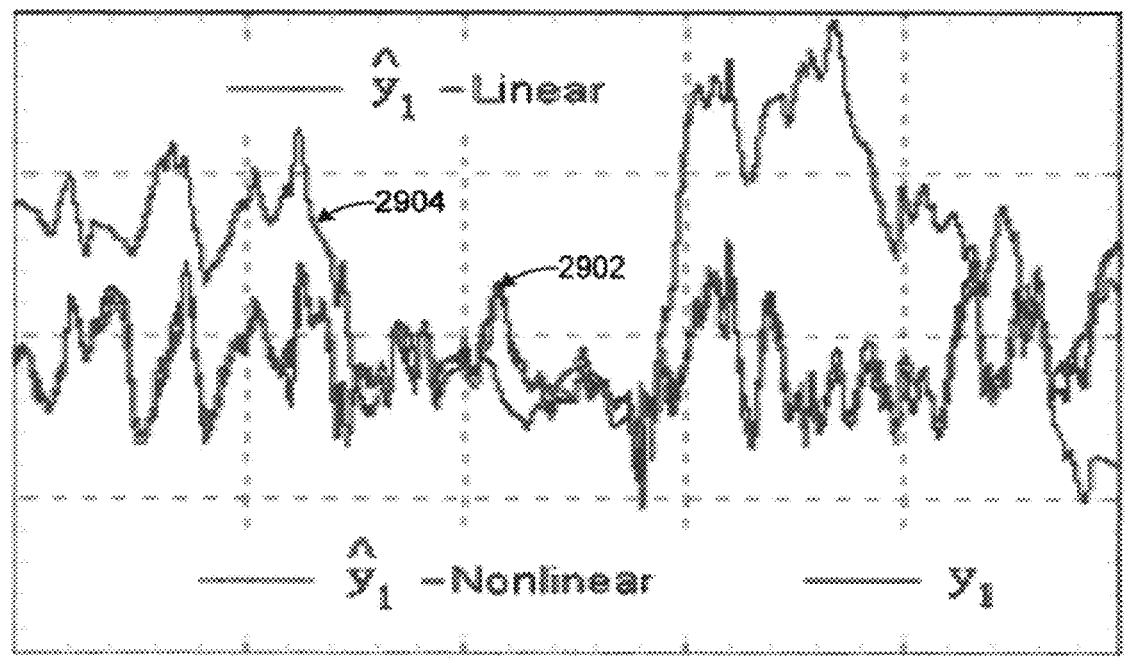

The need for nonlinear models with this unit can be easily confirmed by using the same data to generate linear models. A comparison between linear and nonlinear predictions for a controlled variable CV1 is shown in FIG. 29. In FIG. 29, lines 2902 represent $y_1$ and the non-linear $\hat{y}_1$ (which are closely matched), while line 2904 represents the linear $\hat{y}_1$.

Care should be used in interpreting prediction results. With simulation studies, it is trivial to generate cross-validation data. Unfortunately, this is definitely not the case in the overwhelming majority of process plants. Under the best of conditions, step testing (whether manual or automatic) is usually an undesirable operation. To perform additional stepping merely for cross-validation purposes is seldom accommodated.

Whether cross-validation data is available or not, it may be extremely important to have additional information for model validation. To this end, a powerful tool is the sensitivity plot. Since the models under discussion here are nonlinear, it can be very revealing to display how the gain and processes vary as a function of the inputs. Indeed, in all the cases shown here, the gain surface or curves as a function of the inputs have been observed and investigated.

Figure 30A:
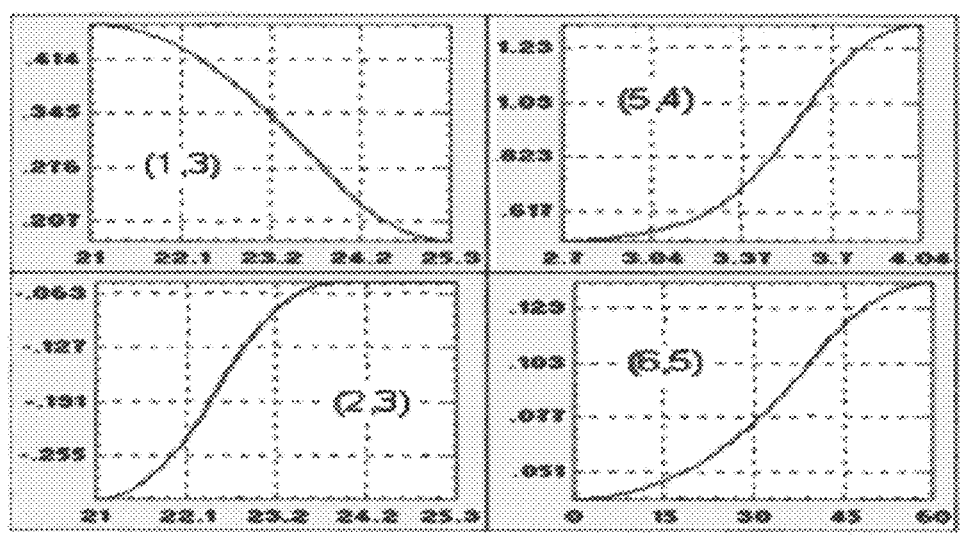
Figure 30B:
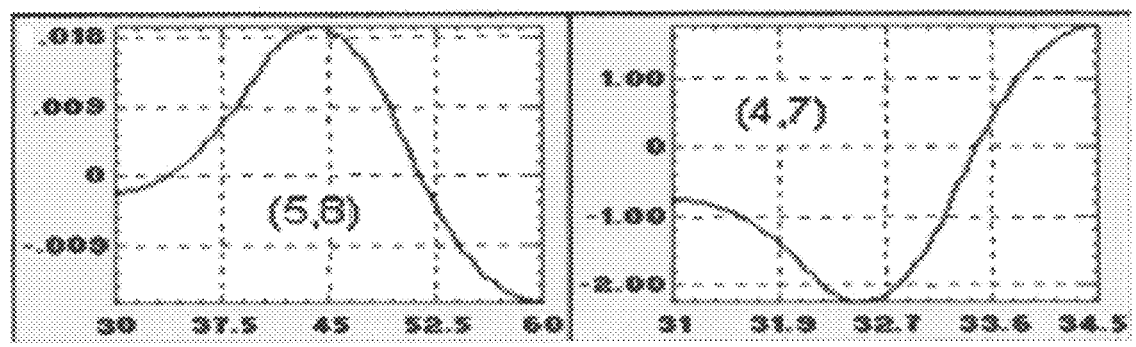

The use of this capability for the air separation unit has been invaluable. For example, the gain sensitivities for a few selected input/output pairs are given in FIGS. 30A and 30B. Ideally, these curves represent what is expected of the physical process and should be smooth and well-behaved. Examples of acceptable performance are illustrated in FIG. 30A. Any oscillation or wiggle indicates either insufficient information content in the data (over-fitting) for the specified model structure or the possibility that there is no physical relationship between input/output pairs. This also reveals how nonlinear the data is. If the gains only vary between 100-200%, a linear controller may suffice. Examples of unacceptable performance are illustrated in FIG. 30B. These gain curves make no physical sense. Note also the gains change sign, which may be impossible for a given process. In this case, controlled variables #3 and #4 and manipulated variables #6 and #7 from the original set are not reliable and can be removed from the model.

To summarize, a new technique for nonlinear process identification has been presented here. Use of Hammerstein, Wiener, and more general N-L-N block-oriented structures for identification has been detailed. The construction of two particular bases functions, one that uses an estimate of the process poles and the other that uses a predefined set of special cubic splines, have been described. Both bases allow for the direct inclusion of a priori information (if it exists) into system identification. It has also been shown that this formulation implicitly accommodates nonlinear dynamics. Several test cases have been presented showing the flexibility of the approach.

Although FIGS. 2 through 30B illustrate details of an example tool 144 for nonlinear process identification using orthonormal bases and ordinal splines, various changes may be made to these figures. For example, various figures illustrate example models, knot distributions, gain and other curves, and various other data. These are for illustration only, and the tool 144 could operate using any other suitable data to produce any other suitable results. Also, while the method 400 shown in FIG. 4 includes a series of steps, various steps in FIG. 4 could overlap, occur in parallel, or occur multiple times.

In some embodiments, various functions described above are implemented or supported by a computer program that is formed from computer readable program code and that is embodied in a computer readable includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "obtain" and its derivatives refer to any acquisition of data or other tangible or intangible item, whether acquired from an external source or internally (such as through internal generation of the item). The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. For example, while the above techniques have been described with respect to SISO systems, the techniques could be expanded for use with other types of systems (such as multiple input, multiple output or "MIMO" systems). Accordingly, the above description of example embodiments does not define or constrain this disclosure. Other changes, substitutions, and alterations are also possible without departing from the spirit and scope of this disclosure, as defined by the following claims.

What is claimed is:

1. A computer-implemented method comprising:
storing, in one or more memories of at least one computing device, data comprising measurements of variables associated with an industrial process system; and
identifying, with one or more processors of the at least one computing device, a model defining a behavior of the industrial process system using the data, an orthonormal bases function that captures process dynamics of the industrial process system, and an ordinal spline bases function that captures static nonlinearities of the industrial process system.

2. The method of claim 1, further comprising:
generating the orthonormal bases function using estimated poles of the industrial process system; and
generating the ordinal spline bases function using a specified set of cubic splines.

3. The method of claim 1, further comprising:
identifying a distribution of knots and multiple ordinal spline functions, each ordinal spline function associated with one of the knots; and
generating the ordinal spline bases function using at least one of the ordinal spline functions.

4. The method of claim 3, wherein identifying the distribution of knots comprises associating more knots with a more nonlinear portion of the industrial process system and fewer knots with a less nonlinear portion or a linear portion of the industrial process system.

5. The method of claim 1, wherein identifying the model comprises selecting one of: a Hammerstein model structure, a Wiener model structure, and an N-L-N model structure.

6. The method of claim 1, wherein identifying the model comprises selecting one or more instruments, each instrument comprising a linear or nonlinear combination of two or more inputs or outputs associated with the industrial process system.

7. A method comprising:
using at least one processing device:
receiving data associated with operation of an industrial process system; and
identifying a model defining a behavior of the industrial process system using the data, an orthonormal bases function, and an ordinal spline bases function, wherein identifying the model comprises performing a convex optimization without multiple iterations.

8. The method of claim 1, wherein identifying the model accommodates nonlinear dynamics of the industrial process system.

9. The method of claim 1, further comprising:
using the identified model to control the industrial process system.

10. An apparatus comprising:
at least one memory device configured to store data comprising measurements of variables associated with an industrial process system; and
at least one processing device configured to identify a model defining a behavior of the industrial process system using the data, an orthonormal bases function that captures process dynamics of the industrial process system, and an ordinal spline bases function that captures static nonlinearities of the industrial process system.

11. The apparatus of claim 10, wherein the at least one processing device is further configured to:
generate the orthonormal bases function using estimated poles of the industrial process system; and
generate the ordinal spline bases function using a specified set of cubic splines.

12. The apparatus of claim 10, wherein the at least one processing device is further configured to:
identify a distribution of knots and multiple ordinal spline functions, each ordinal spline function associated with one of the knots; and
generate the ordinal spline bases function using at least one of the ordinal spline functions.

13. The apparatus of claim 12, wherein the at least one processing device is configured to identify the distribution of knots by associating more knots with a more nonlinear portion of the industrial process system and fewer knots with a less nonlinear portion or a linear portion of the industrial process system.

14. The apparatus of claim 10, wherein the at least one processing device is configured to identify the model by selecting one of: a Hammerstein model structure, a Wiener model structure, and an N-L-N model structure.

15. The apparatus of claim 10, wherein the at least one processing device is configured to identify the model by selecting one or more instruments, each instrument comprising a linear or nonlinear combination of two or more inputs or outputs associated with the industrial process system.

16. An apparatus comprising:
at least one memory device configured to store data associated with operation of an industrial process system; and
at least one processing device configured to identify a model defining a behavior of the industrial process system using the data, an orthonormal bases function, and an ordinal spline bases function, wherein the at least one processing device is configured to identify the model by performing a convex optimization without multiple iterations.

17. A non-transitory computer readable storage medium embodying a computer program, the computer program comprising computer readable program code for:
receiving data comprising measurements of variables associated with an industrial process system; and
identifying a model defining a behavior of the industrial process system using the data, an orthonormal bases function that captures process dynamics of the industrial process system, and an ordinal spline bases function that captures static nonlinearities of the industrial process system.

18. The non-transitory computer readable storage medium of claim 17, wherein the computer program further comprises computer readable program code for:
generating the orthonormal bases function using estimated poles of the industrial process system; and
generating the ordinal spline bases function using a specified set of cubic splines.

19. The non-transitory computer readable storage medium of claim 17, wherein the computer program further comprises computer readable program code for:
identifying a distribution of knots and multiple ordinal spline functions, each ordinal spline function associated with one of the knots; and
generating the ordinal spline bases function using at least one of the ordinal spline functions.

20. The non-transitory computer readable storage medium of claim 17, wherein the computer readable program code for identifying the model comprises computer readable program code for:
selecting one of: a Hammerstein model structure, a Wiener model structure, and an N-L-N model structure; and
selecting one or more instruments, each instrument comprising a linear or nonlinear combination of two or more inputs or outputs associated with the industrial process system.

21. The method of claim 1, wherein receiving the data comprises:
providing one or more inputs to the industrial process system; and
identifying how one or more outputs of the industrial process system change in response to the one or more inputs.

22. The method of claim 1, wherein identifying the model comprises identifying the process dynamics and the static nonlinearities of the industrial process system using the data.

23. A computer-implemented method comprising:
storing, in one or more memories of at least one computing device, data associated with operation of an industrial process system; and
identifying, with one or more processors of the at least one computing device, a model defining a behavior of the industrial process system using the data, an orthonormal bases function, and an ordinal spline bases function;
wherein identifying the model comprises identifying dynamic and static non-linear behaviors of the industrial process system using the data;
wherein the orthonormal bases function captures the dynamic behavior of the industrial process system;
wherein the ordinal spline bases function captures the static non-linear behavior of the industrial process system; and
wherein identifying the dynamic behavior of the industrial process system comprises:
identifying a continuous-time reduced-order transfer function matrix that ranks each of multiple sub-models with respect to model quality;
identifying poles and delays for at least some of the sub-models;
sorting at least some of the identified poles with redundant elements removed; and
identifying the orthonormal bases function using remaining poles and associated delays.

24. The method of claim 22, wherein identifying the static nonlinearities of the industrial process system comprises:
identifying multiple ordinal spline functions using inputs and outputs of the industrial process system at a specified number of knot points;

normalizing the ordinal spline functions;
identifying second derivatives of the normalized ordinal spline functions at each knot point; and
obtaining coefficients of the ordinal spline functions using the second derivatives, the static nonlinearities of the industrial process system captured using the coefficients.

* * * * *